US008201256B2

(12) United States Patent
Patanella

(10) Patent No.: US 8,201,256 B2
(45) Date of Patent: Jun. 12, 2012

(54) METHODS AND SYSTEMS FOR ASSESSING AND ADVISING ON ELECTRONIC COMPLIANCE

(75) Inventor: Joseph Patanella, Annapolis, MD (US)

(73) Assignee: Trustwave Holdings, Inc., Chicago, IL (US)

( * ) Notice: Subject to any disclaimer, the term of this patent is extended or adjusted under 35 U.S.C. 154(b) by 0 days.

(21) Appl. No.: 10/400,924

(22) Filed: Mar. 28, 2003

(65) Prior Publication Data
US 2004/0193907 A1 Sep. 30, 2004

(51) Int. Cl.
H04L 29/06 (2006.01)
(52) U.S. Cl. ........................... 726/25; 726/23
(58) Field of Classification Search .................. 713/201; 726/1, 22, 23, 24, 25
See application file for complete search history.

(56) References Cited

U.S. PATENT DOCUMENTS

| 6,192,112 | B1* | 2/2001 | Rapaport et al. ........... 379/88.22 |
| 6,453,419 | B1* | 9/2002 | Flint et al. ........... 726/3 |
| 6,535,227 | B1* | 3/2003 | Fox et al. ........... 715/736 |
| 6,804,787 | B2* | 10/2004 | Dick ........... 726/1 |
| 6,926,668 | B2* | 8/2005 | Bardy ........... 600/301 |
| 6,957,348 | B1 | 10/2005 | Flowers et al. |
| 7,134,015 | B2* | 11/2006 | Kulack et al. ........... 713/166 |
| 7,143,074 | B2* | 11/2006 | Higgins et al. ........... 706/45 |
| 7,260,830 | B2* | 8/2007 | Sugimoto ........... 726/1 |
| 7,415,437 | B2* | 8/2008 | Marvin et al. ........... 705/37 |
| 7,493,266 | B2* | 2/2009 | Gupta ........... 705/3 |
| 7,536,456 | B2* | 5/2009 | Williams et al. ........... 709/224 |
| 7,627,891 | B2* | 12/2009 | Williams et al. ........... 726/1 |
| 7,668,736 | B2* | 2/2010 | Jones et al. ........... 705/3 |
| 7,668,947 | B2* | 2/2010 | Hutchinson et al. ........... 709/223 |
| 7,853,468 | B2* | 12/2010 | Callahan et al. ........... 705/8 |
| 2001/0049793 | A1* | 12/2001 | Sugimoto ........... 713/200 |
| 2002/0019747 | A1* | 2/2002 | Ware et al. ........... 705/2 |
| 2002/0104014 | A1* | 8/2002 | Zobel et al. ........... 713/200 |
| 2002/0129221 | A1* | 9/2002 | Borgia et al. ........... 712/1 |
| 2002/0138417 | A1* | 9/2002 | Lawrence ........... 705/38 |
| 2002/0194022 | A1* | 12/2002 | Comite ........... 705/2 |
| 2003/0004754 | A1* | 1/2003 | Krutz ........... 705/2 |
| 2003/0009355 | A1* | 1/2003 | Gupta ........... 705/2 |
| 2003/0051026 | A1* | 3/2003 | Carter et al. ........... 709/224 |
| 2003/0065942 | A1* | 4/2003 | Lineman et al. ........... 713/201 |
| 2003/0070003 | A1* | 4/2003 | Chong et al. ........... 709/330 |

(Continued)

FOREIGN PATENT DOCUMENTS
WO  WO 01/73553  10/2001

OTHER PUBLICATIONS

NIST risk management guid for information technology system, Stoneburner et al. Jul. 2002, pp. 1-55.*

(Continued)

Primary Examiner — David García Cervetti
(74) Attorney, Agent, or Firm — Hanley, Flight & Zimmerman, LLC

(57) ABSTRACT

A method and system of developing electronic performance support systems implemented in a computer system or in a graphical user interface. A method and system determines electronic compliance with a regulatory scheme, includes a compliance standard and using a question and answer prompt in conjunction with a scanning engine to perform an assessment of a computer network's compliance with at least one predetermined standard in addition to a technical assessment of the computer network.

35 Claims, 44 Drawing Sheets

U.S. PATENT DOCUMENTS

| | | | |
|---|---|---|---|
| 2003/0074559 A1* | 4/2003 | Riggs | 713/168 |
| 2003/0093696 A1* | 5/2003 | Sugimoto | 713/201 |
| 2003/0115484 A1* | 6/2003 | Moriconi et al. | 713/201 |
| 2003/0126469 A1* | 7/2003 | King et al. | 713/201 |
| 2003/0172127 A1* | 9/2003 | Northrup et al. | 709/219 |
| 2003/0195861 A1* | 10/2003 | McClure et al. | 707/1 |
| 2003/0212909 A1* | 11/2003 | Chandrashekhar et al. | 713/201 |
| 2004/0010709 A1* | 1/2004 | Baudoin et al. | 713/201 |
| 2004/0030923 A1* | 2/2004 | Tindal et al. | 713/201 |
| 2004/0049750 A1* | 3/2004 | Gentry et al. | 716/5 |
| 2004/0064731 A1* | 4/2004 | Nguyen et al. | 713/201 |
| 2004/0078568 A1* | 4/2004 | Pham et al. | 713/165 |
| 2004/0128186 A1* | 7/2004 | Breslin et al. | 705/10 |
| 2004/0181665 A1* | 9/2004 | Houser | 713/158 |
| 2005/0131740 A1* | 6/2005 | Massenzio et al. | 705/2 |
| 2005/0178824 A1* | 8/2005 | Benson et al. | 235/380 |
| 2005/0187963 A1* | 8/2005 | Markin | 707/102 |
| 2005/0257267 A1* | 11/2005 | Williams et al. | 726/25 |
| 2007/0283171 A1* | 12/2007 | Breslin et al. | 713/193 |
| 2008/0016569 A1* | 1/2008 | Hammer et al. | 726/23 |
| 2010/0010828 A1* | 1/2010 | Gupta | 705/2 |

OTHER PUBLICATIONS

Inoue, T., "Nothing is Cheaper than Free!? A Secure Environment Made by Freeware, Part 11, Scan Results of Integrated Security Diagnosis Tool 'SAINT' and Their Interpretation", Computer & Network LAN, vol. 21, No. 2, pp. 68-72, Feb. 2003.

* cited by examiner

FIG. 3A

Visa U.S.A. Cardholder Information Security Program (CISP)
Security Audit Procedures and Reporting This guide is designed to assist an independent third-party security firm verify that a select merchant or service provider is in compliance with Visa U.S.A. Cardholder Information Security Program (CISP). Should you have any questions about the following guidelines, contact Visa for clarification before proceeding with the audit or visit http://www.usa.visa.com/cisp for more information.

Security Assessment Process
Objectives
1. Protect Visa cardholder information from unauthorized access by verifying that an entity has correctly implemented information security controls.
2. Reduce fraud associated with unauthorized access to Visa cardholder information.
3. Identify security issues that could lead to the compromise of Visa cardholder information.
4. Measure a merchant or service provider's level of compliance with the CISP.

Scope of Assessment
The following will help to assist merchants, service providers and security assessors in determining the scope of the audit.

E-Commerce Environment
CISP validation must be performed on the e-commerce environment. The e-commerce environment is defined as any system(s) or system component(s) where Visa cardholder data is retained, stored, or transmitted. Refer to sampling note for a list of some of the systems that may be included.

Outsourcing
For those entities that outsource handling or storage of Visa cardholder data to third-party service providers, the Report On Compliance must document the role of each service provider as it relates to the CISP. Additionally, merchants and service providers must concurrently require all associated third parties with access to cardholder data to adhere to CISP data security requirements. Refer to CISP Requirement 11.7 for details.

Sampling Note
To test the systems within the e-commerce environment, the assessor can select a sample of those systems. The sample must be a representative selection of all of the types of systems and operating systems in the e-commerce environment, and include a variety of operating systems, functions, and applications as applicable to the area being reviewed. For example, the reviewer could choose a Sun server running Apache WWW, a NT server running Oracle, a data transfer server running HP-UX, a Linux Server running MYSQL, etc. If all applications run from a single OS (e.g. NT, Sun, etc.), then the sample should still include a variety of applications (e.g., database servers, web servers, data transfer servers, etc.).

The various samples referenced in this document are defined here for ease of reference:
* Firewalls/routers: a representative selection of firewall and router components used to transmit/protect cardholder data. Sample used in Testing Procedures 1, 2, 6, 7, 8, 9.
* Database servers: a representative selection of database machines that store cardholder data. Each database machine will typically contain multiple database instances with multiple tables per instance. For those tests that require examination of database elements or schemas, the instances and tables that store cardholder data can also be representatively sampled. Samples used in Testing Procedures 2, 3, 5, 6, 7, 8, 9.
* Other critical servers: a representative selection of other servers used to process, store, or transmit cardholder data, or which support critical infrastructure for that environment (e.g., web servers, application servers, data transfer servers, data normalization servers, domain name servers (DNS)). Sample used in Testing Procedures 2, 5, 6, 7, 8, 9.

Roles and Responsibilities
Within the security assessment process, the following players have major roles and responsibilities:

FIG. 3B

Visa U.S.A. Cardholder Information Security Program (CISP)
Security Audit Procedures and Reporting

Visa
- Develop CISP requirements and Security Audit Procedures (SAP)[1] for assessment of select merchant and service provider environment.
- Review completed Report On Compliance (ROC) and respond to merchant or service provider with a letter of acceptance.
- Follow-up with merchant or service provider and security firm to correct any non-compliance issues and subsequently get into full compliance.
- A list of service providers who have completed the program will be provided to merchant banks.

Merchant Bank
- Be primary link between Visa and merchant.
- Hold financial responsibility in the Visa system for ensuring merchant's compliance with CISP and other Operating Regulations.
- Follow-up with merchant to correct any non-compliance issues and subsequently get into full compliance.

Select Merchant
- Comply with all provisions of CISP.
- Contractually require all associated third parties with access to cardholder data to adhere to CISP.
- Engage an independent security firm to validate CISP compliance.
- Provide necessary documentation that a security firm requires in order to perform the security assessment process. As part of the security assessment process, the security firm collects information about the organization, contracts, documented security policies and procedures. Note that providing these items in a timely manner helps keep assessment fee at a reasonable level.
- Ensure staff that manages the merchant's security-related functions are available for the security firm during the assessment process.
- Promptly correct any identified security deficiencies.

Service Provider
- Comply with all provisions of CISP.
- Contractually require all associated third parties with access to cardholder data to adhere to CISP.
- Engage an independent security firm to validate CISP compliance.
- Provide necessary documentation that a security firm requires in order to perform this security assessment process. As part of the security assessment process, the security firm collects information about the organization, contracts, documented security policies and procedures. Note that providing these items in a timely manner helps keep assessment fee at a reasonable level.
- Ensure staff that manages the service provider's security-related functions are available for the security firm during the assessment process.
- Promptly correct any identified security deficiencies.

Independent Security Firm
- Conduct an onsite security assessment review based on Visa U.S.A. CISP and Security Audit Procedures.
- Preview the scope of the assessment with merchant or service provider. Typically Visa expects these examinations to be conducted with a standard audit approach, to include:
  1. Gathering documentation before interviews, observations and tests begin.
  2. Determining the scope and timeframe of the assessment based on merchant or service provider's environment and Visa's requirements.
  3. Obtaining approval of data owner if any access to a secured environment is necessary during the assessment.

[1] Visa's testing procedures to validate compliance with the CISP.

FIG. 3C

Visa U.S.A. Cardholder Information Security Program (CISP)
Security Audit Procedures and Reporting 4. Scheduling interviews with merchant or service provider's staff. Interviewees typically include the individuals who are responsible for contract administration or legal department staff, human resources, information security, network security, physical security, and staff with access to Visa cardholder data.
5. Performing physical examination of technical parameter settings and review supporting documentation.
6. Using Visa's required Report On Compliance (ROC) template below to report audit results and findings. Security firm must ensure that the report is not edited without assessor's knowledge prior to distribution to Visa. (e.g., distribute the report in a read-only format).
7. Providing consultation to the merchant or service provider to ensure entity fully understands the Report On Compliance report and findings.

Report On Compliance
The Report On Compliance (ROC) must be securely distributed to Visa, merchant and Acquirer or service provider and is a condition of ongoing Visa card acceptance. Visa will classify the Report as "Visa Secret.[2]" All independent security firms must apply the following report content and format when completing the Report On Compliance (ROC):

1. Executive Summary
   Include the following:
   - Business description
   - Environment in which the assessment was focused (i.e., client's internet access points, internal corporate network). Visa USA requires an assessment to be performed on selected systems that handle and/or store cardholder information.
   - Any service provider relationships
   - Any wholly-owned entities that require compliance with CISP
   - Any international entities that require compliance with CISP
   - Any wireless LANs and/or wireless POS terminals connected to the e-commerce environment.

2. Description of Scope of Work and Approach Taken
   - The depth to which assessment was performed and a high-level overview of the methodology.
   - Timeframe of assessment
   - Any specific requests beyond the scope of the Visa Security Audit Procedures (SAP), such as vulnerability scans, penetration test and/or application code review that may have been performed.
   - List of those interviewed
   - List of documentation reviewed 3. Findings and Observations
   - Describe tests performed other than Visa Security Audit Procedures (SAP) for the requirements.
   - Independent security firms must utilize the template beginning on page 5 to provide detailed report findings on each requirements and sub-requirements.

4. Contact Information and Report Date
   - Include select merchant or service provider and security firm contact details

---

[2] This classification applies to the most sensitive business information, which is intended for use within Visa. Its unauthorized disclosure could seriously and adversely impact Visa, its employees, member banks, business partners, and/or the Brand.

FIG. 3D

Visa U.S.A. Cardholder Information Security Program (CISP)
Security Audit Procedures and Reporting

Definitions

For the purposes of the Security Audit Procedures the following definitions will be used:

- Requirements – The Cardholder Information Security Program requirements by which an assessment firm and Visa will validate a merchant or service provider's CISP compliance.
- Best Practices – Recommended processes for an entity to use, in addition to or to enhance required processes. Best practices may become required processes at the discretion of the Security Assessor or Visa, depending on other controls in place and the risk level of the business process.
- Testing Procedure – A process to be followed by an independent security audit firm to address individual requirements and testing considerations.
- In Place – Please provide a brief description of controls found in place, including those controls found to be in place as a result of compensating controls.
- Not in Place – Please provide a brief description controls that are not in place.
- Target Date/ Comments – For those controls "Not in Place" include a target date that the merchant or service provider expects to have controls "In Place". Any additional notes or comments may be included here as well.

| Requirements | Best Practices | Testing Procedures | In Place | Not in Place | Target Date/ Comments |
|---|---|---|---|---|---|
| Requirement 1: Install and maintain a working firewall to protect data | | | | | |
| 1.1 Establish a formal process for approving all external network connections. | A separate DMZ segment may be used for VISA cardholder information.<br><br>Do not store cardholder data on front-end systems.<br><br>The DMZ should not be able to talk directly to trusted network.<br><br>Transactions that need to move from DMZ to internal network should be batched in DMZ and then pulled by internal network from DMZ.<br><br>Consider network encryption (SSL) between front-end systems and back-end databases. This Best Practice may become | 1.1 Verify that a process requiring written approval for all new network connections is included in a firewall administration policy, and that the firewall administration policy exists, is documented and implemented, and requires the builded items below. Verify existence of these items:<br><br>• A current network diagram that documents all connections to Visa cardholder data<br>• Existence of a firewall at each internet connection and between any DMZ and the Intranet<br>• Description of groups, roles, and responsibilities for logical management of network components<br>• A documented list of services / ports necessary for the business<br>• Justification and documentation for any available protocols besides HTTP and SSL, SSH, and VPN<br>• Periodic review of firewall/router rule sets<br>• Management approval for external network connections and all other changes to the firewall configuration<br>• Configuration standards for firewalls and routers, including testing of all changes prior to implementation. | | | |

FIG. 3E

Visa U.S.A. Cardholder Information Security Program (CISP)
Security Audit Procedures and Reporting

| Requirements | Best Practices | Testing Procedures | In Place | Not in Place | Target Date/ Comments |
|---|---|---|---|---|---|
| 1.2 Build a firewall that will: <br><br> Note: Any business protocols outside of the scope of the CISP requirements must be justified and documented in your company policy. | a requirement at the discretion of the Security Assessor or Visa if the examined entity relies heavily on compensating controls to meet CISP requirements, or engages in more risky business processes (such as processes which recognizes the customer, and on subsequent visits, populate transactions with cardholder data when a password is entered). | 1.2 Verify firewall/router configurations by reviewing a sample of firewalls/routers (Sampling Note, page 1) for those implemented 1) between the Internet and the DMZ and 2) between the DMZ and the Internal network. For example, include the crimp router at the Internet, the DMZ router and firewall, the DMZ cardholder segment, the perimeter router, and the internal cardholder network segment. Inspect network diagrams, firewall rule sets, router configuration settings, etc., as follows. | | | |
| 1.2.1 Deny all traffic from "untrusted" networks/hosts, except for: <br> • Web protocols – The Visa system only allows HTTP – port 80 and Secure Sockets Layer (SSL) – typically port 443. <br> • System administration protocols (e.g. Secure Shell (SSH) or Virtual Private Network (VPN). <br> • Other protocols required by the business. | For best-practice security configurations, consider The Center for Internet Security's benchmark and | 1.2.1 To determine that inbound and outbound traffic is acceptable and documented, verify that traffic is limited to: <br> • Web protocols (HTTP, HTTPS) <br> • System administration/remote access methods (VPN, SSH) <br> • Other allowed traffic required by the business and documented in the firewall policy. | | | |

FIG. 3F

Visa U.S.A. Cardholder Information Security Program (CISP)
Security Audit Procedures and Reporting

| Requirements | Best Practices | Testing Procedures | In Place | Not in Place | Target Date/Comments |
|---|---|---|---|---|---|
| 1.2.2 Restrict connections between publicly accessible servers and any component storing cardholder data. The firewall configuration must deny all traffic except for protocols required by the business. | scoring tool for Cisco IOS routers (www.cisecurity.org), as well as a Top 20 Scanner scan for the FBI/SANS Top 20 vulnerabilities at www.cisecurity.org vulnerabilities at www.sans.org/top20) | 1.2.2 To determine that connections are restricted between publicly accessible servers and components storing cardholder data, verify the following:<br>• Inbound internet traffic is limited to IP addresses within the DMZ.<br>• Inbound and outbound internet traffic is limited to ports 80 and 443.<br>• Internal addresses cannot pass from the internet into the DMZ.<br>• Only established connections are allowed in, and only if they are associated with a previously established session (run NMAP with "syn reset" or "syn ack" bits set – a response means packets are allowed through even if they are not part of a previously established session).<br>• Outbound traffic is limited to that which is necessary for the Visa cardholder environment.<br>• Running configuration files (e.g., those used for normal running of the routers) and start-up configuration files (those used when machines are re-started) have the same secure configurations.<br>• All other inbound and outbound traffic not covered in 1.2.1 above is specifically denied.<br><br>1.2.3 To determine that direct access between external public networks and components storing cardholder data are prohibited, perform the following, specifically for the firewall/router configuration implemented between the DMZ and the internal network:<br>• Verify there is no direct route inbound or outbound for Internet traffic.<br>• Verify that internal outbound traffic from cardholder applications can only access IP addresses within the Visa DMZ. | | | |
| 1.2.3 Prohibit an external network direct public access to any system component that is storing cardholder information (i.e., databases). | | | | | |

FIG. 3G

Visa U.S.A. Cardholder Information Security Program (CISP)
Security Audit Procedures and Reporting

| Requirements | Best Practices | Testing Procedures | In Place | Not in Place | Target Date/ Comments |
|---|---|---|---|---|---|
| 1.3 Implement Internet Protocol (IP) masquerading to prevent your internal address from being translated and revealed on the Internet. Use technologies such as Port Address Translation (PAT) or Network Address Translation (NAT). | | 1.3 For firewall components reviewed in 1.2, above, verify that NAT or other technology is used for IP masquerading to restrict broadcast of IP addresses from the internal network to the Internet. | | | |
| 1.4 Implement 2-factor authentication for remote access to the network. Use technologies such as RADIUS or TACACS with tokens. | | 1.4 To verify that 2-factor authentication is in place for remote network access, observe an administrator while they connect remotely and verify that both a password and an additional authentication item (Smart card or token PIN, etc.) are requested. | | | |
| 1.5 Ensure your firewall and router platform: 1.5.1 Conforms to your organization's system configuration standards. 1.5.2 Is restricted to only one application or primary function per server. 1.5.3 Meets or exceeds the minimum hardware and software requirements. | | 1.5 Processes in place for Operating System hardening, including for firewalls and routers, are validated under Requirement 8, Testing Procedure 8.2.3. | | | |
| 1.6 Monitor your firewall Central Processing Unit (CPU) load and up/down status with reasonable regularity (at least every 15 minutes). | | 1.6 Verify that the processes used to ensure continual firewall redundancy and availability include checking for load and up/down status at least every 15 minutes. | | | |
| | | Processes in place to encrypt non-console administrative access to firewalls and operating systems are validated under Requirement 4, Testing Procedure 4.4. | | | |
| | | Administrative access controls (or network components are validated under Requirement 6, Testing Procedure 6.1. | | | |
| Requirement 2: Keep security patches up-to-date. | | | | | |
| 2.1 Make sure all systems and software have the latest vendor-supplied security patches. Note: "Systems and software" include, but are not limited to: servers, routers, switches, firewalls, operating systems, applications, databases, etc. | Each vendor typically lists recommended security patches on their web site. For example, Microsoft is at www.microsoft.com/security underneath the security bulletins section and Sun | 2.1 Using the sample firewalls/routers, database servers, and other critical servers (sampling Note on page 1), perform the following for each system selected | | | |

FIG. 3H

Visa U.S.A. Cardholder Information Security Program (CISP)
Security Audit Procedures and Reporting

| Requirements | Best Practices | Testing Procedures | In Place | Not in Place | Target Date/ Comments |
|---|---|---|---|---|---|
| 2.1.1 Keep up with vendor changes and enhancements to security patches | is at www.sun.com/security/patches | 2.1.1 Compare the list of security patches installed on each system to the vendor security patch list to verify that current vendor patches are currently installed. | | | |
| 2.1.2 Install new/modified security patches within one month of release. | Production data (including cardholder data) should not be used for testing. | 2.1.2 Examine policies related to security patch installation to verify that it is policy to install new security patches within 30 days. | | | |
| 2.2 Test all security patches before they are deployed. | | 2.2 Verify the following with the system administrator: <br>• Patches are tested in a test environment before being deployed into production. <br>• The test environment is separate from the production environment. <br>• Test procedures are documented. | | | |
| 2.3 Follow change control procedures for system and software configuration. | | 2.3.a Verify that company change-control procedures used to implement security patches and software modifications require the following: <br>• Documentation of customer impact <br>• Management sign-off by appropriate parties <br>• Specification of an implementation window <br>• Testing that verifies operational functionality <br>• Back-out procedures. <br><br>2.3.b Select one web server, one firewall, and one router from sample firewalls/routers, database servers, and other critical servers (Sampling Note on page 1). To verify that change-control procedures are followed, find the three most recent security related updates (e.g., application of security patches) for each system, and trace those updates back to related change control documentation. Verify that this documentation is completed in accordance with company procedures. | | | |

FIG. 3I

Visa U.S.A. Cardholder Information Security Program (CISP)
Security Audit Procedures and Reporting

| Requirements | Best Practices | Testing Procedures | In Place | Not in Place | Target Date/ Comments |
|---|---|---|---|---|---|
| Requirement 3: Protect stored data. 3.1 Keep cardholder information storage to a minimum. Limit your storage amount and retention time to that which is required for business, legal, and/or regulatory purposes. | Not encrypting VISA Cardholder data within the database will require further precautions be taken to ensure confidentiality and integrity of VISA data that is exported out of the database into bulk copies, dumps of the database and backup media. Note: If encryption techniques cannot be used, account information must be isolated from the Internet to a separate database that is not resident on systems directly connected to the Internet. Ideally, the database should be resident on back-end computers behind an internal firewall (not in the DMZ). One acceptable practice would be to separate account information from sales data on the Web server and to store the account | 3.1 Verify that the company has policies and procedures for data retention and disposal, and that these policies and procedures include the following: • Legal, regulatory, and business requirements for data retention, including specific requirements for retention of VISA cardholder information (e.g., cardholder data needs to be held for X period for Y business reasons). • Disposal of data when no longer needed for legal, regulatory or business reasons, including disposal of cardholder data. • Coverage for all critical servers and directories that store cardholder data, including database servers, transfer directories and bulk data copy directories used to transfer data between servers, and directories used to minimize data between server transfers. • Performance of an audit, at least on a quarterly basis, to verify that stored cardholder data does not exceed business retention requirements. Refer to Requirements 12.6 through 12.10 for storage, maintenance, and destruction requirements for physical media. | | | |
| 3.2 Properly dispose of cardholder information at the end of the required storage retention period. | | 3.2 Verify that cardholder information is disposed of in accordance with company policies examined in Testing Procedures 3.1. above. | | | |
| 3.3 Perform a quarterly inventory audit to verify if any stored cardholder information exceeds your retention requirements. | | 3.3 Verify that, at least quarterly, an audit is performed to ensure no cardholder data exceeds business retention requirements. | | | |
| 3.4 Do not store Card Verification Value 2 (CVV2) data subsequent to a transaction authorization. | | 3.4 Review several database schemas from the sample of database servers (Sampling Note, page 1) and verify that fields do not contain CVV2 data. | | | |

FIG. 3J

Visa U.S.A. Cardholder Information Security Program (CISP)
Security Audit Procedures and Reporting

| Requirements | Best Practices | Testing Procedures | In Place | Not in Place | Target Date/ Comments |
|---|---|---|---|---|---|
| 3.5 Implement a mechanism to segregate each merchant's stored cardholder data. This requirement applies to entities that process and/or store cardholder data for multiple merchants. Entities that only store and/or process cardholder data for a single merchant do not need to comply with this requirement. | Information on the mainframe, off-line, or in a secure zone. Key Storage and Key Management • Do not store private keys or server certificate files in a public place • The best key management is fully automated. | 3.5 Verify, by discussions with database administrators and via inspection of database schemas examined in Testing Procedure 3.4, above, that stored cardholder data is segregated in one of the following ways: • In a separate table or database for each merchant, or • Physically or logically isolated between merchant systems. If merchant data is not segregated, confirm and document use of adequate compensating controls as documented in Attachment B to the CISP Requirements. This testing procedure is only for entities that process and/or store cardholder data for multiple merchants. | | | |
| 3.6 Encrypt all passwords | Hardware encryption is more secure than software encryption, especially those that | 3.6 For critical servers in the cardholder environment, examine password files to verify that passwords are unreadable. Include passwords files for firewalls, routers, operating systems, applications, databases, and web servers. | | | |

FIG. 3K

Visa U.S.A. Cardholder Information Security Program (CISP)
Security Audit Procedures and Reporting

| Requirements | Best Practices | Testing Procedures | In Place | Not in Place | Target Date/ Comments |
|---|---|---|---|---|---|
| 3.7 Render unreadable stored cardholder data by using any of the following approaches:<br>• One-way ciphers (hashed indexes), such as SHA-1, but not MD5<br>• Truncation<br>• Simple ciphers<br>• Index tokens and PADs, with the PADs being securely stored<br>• Strong cryptography, such as Triple-DES, with associated key management processes and procedures. | erase the encryption key if the device is tampered with.<br>Software products may be used depending on circumstances, but hardware devices are preferred.<br>Keys should be randomly generated by an automatic process, where every key is equally likely to be chosen. If keys must be easy-to-remember, make them obscure.<br>• Consider split responsibility for keys such that it requires 2 or 3 people, each knowing only their part of the key, to reconstruct the whole key. | 3.7.a Document information about the cryptographic system used to protect stored data, including the vendor, type of cryptographic system, and the encryption algorithms. Verify that data is encrypted using one of the following algorithms:<br>• One-way ciphers (hashed indexes), such as SHA-1, but not MD5<br>• Truncation<br>• Simple ciphers<br>• Index tokens and PADs, with the PADs being securely stored<br>• Strong cryptography, such as Triple-DES, with associated key management processes and procedures.<br><br>*If cardholder data is not encrypted, confirm and document use of adequate compensating controls as documented in Attachment A to the CISP Requirements.*<br><br>3.7.b Examine several tables from the sample of database servers (Sampling Note, page 1) to verify the data is encrypted (i.e., not stored in plain text). | | | |
| 3.8 Implement a cryptographic solution that: | Key-encryption keys should be used to encrypt keys prior to distribution – distribute key-encrypting keys manually and securely.<br>Use hardware systems with anti-tamper enclosures to store keys, if possible. Ideally, a key should never appear unencrypted outside | 3.8 Review vendor and company documentation for the cryptographic solution to verify existence of documentation and that the solution in place includes the following: | | | |
| 3.8.1 Is isolated so that secret data cannot be disclosed | | 3.8.1 Physical or logical isolation to protect secret data. | | | |
| 3.8.2 Conforms to applicable international and national standards, as well as all legal and regulatory controls | | 3.8.2 Adherence to international and national standards as well as legal and regulatory controls. | | | |
| 3.8.3 Uses only crypto devices that meet the approval standards and policies of your organization. | | 3.8.3 Existence of, and adherence to, organization's approval standards and policies for use of crypto devices. | | | |
| 3.9 Protect encryption keys against both disclosure and misuse. | | 3.9 Verify that processes to protect encryption keys against disclosure and misuse include the following: | | | |
| 3.9.1 Restrict access to keys to the fewest number of custodians necessary. | | 3.9.1 Access to cryptographic keys is restricted to very few custodians. | | | |

FIG. 3L

Visa U.S.A. Cardholder Information Security Program (CISP)
Security Audit Procedures and Reporting

| Requirements | Best Practices | Testing Procedures | In Place | Not in Place | Target Date/ Comments |
|---|---|---|---|---|---|
| 3.8.2 Store keys securely in the fewest possible locations and forms. | the encryption device. Store keys used to encrypt keys separately from keys used to encrypt data. No encryption key should be used for an indefinite period – it should expire automatically. However, keys used to encrypt data files for storage can't be changed often. Instead, for example, encrypt each file with a unique file key, and then encrypt all file keys with a key-encryption key. The key-encryption key should then be memorized or stored in a secure location. | 3.9.2 Storage of cryptographic keys in encrypted format and storage of key-encrypting keys separately from data-encrypting keys. | | | |
| 3.9.3 Limit the risks associated with shared symmetric keys, only use them for "one-to-one" communication between two entities. | | 3.9.3 Shared symmetric keys are only used for one-to-one communication between two entities. | | | |
| 3.10 Fully document all key management processes and procedures. | | 3.10 Verify the existence of key management procedures, and that these procedures have provisions for the following:<br>• Generation of strong keys<br>• Secure key distribution<br>• Secure key storage<br>• Periodic key changes<br>• Destruction of old keys.<br>See related Key Management Best Practices at left. | | | |
| § Refer to Attachments A & B to the CISP Requirements: Encrypt Stored Data and Data Segregation Mechanisms for further details. | | | | | |
| Requirement 4: Encrypt transmission of cardholder and sensitive information across public networks. | | | | | |
| 4.1 Use encryption techniques such as Secure Sockets Layer (SSL), Point-to-Point Tunneling Protocol (PPTP), Internet Protocol Security (IPSEC), etc., to make sensitive data impossible to read during transmission. | Consider network encryption (SSL) between front-end systems and back-end database. This Best Practice may become a requirement at the discretion of the Security Assessor or Visa if the examined entity relies heavily on compensating controls to meet CISP. | 4.1 Verify the use of encryption (e.g., SSL) wherever cardholder data is transmitted or received over the Internet by performing the following:<br>• For SSL implementations, verify that HTTPS appears as a part of the browser Universal Record Locator (URL) during a transaction, and that no cardholder data was required when HTTPS did not appear in the URL. Select a sample of transactions as they are received from a cardholder or merchant, and observe the transactions as they occur to verify that cardholder data is encrypted during transit. | | | |

FIG. 3M

Visa U.S.A. Cardholder Information Security Program (CISP)
Security Audit Procedures and Reporting

| Requirements | Best Practices | Testing Procedures | In Place | Not in Place | Target Date/ Comments |
|---|---|---|---|---|---|
| 4.2 Never send cardholder information via unencrypted e-mail. | requirements, or engages in more risky business processes (such as recognizing the customer, and on subsequent visits, populating the transactions with cardholder data when a password is entered). | 4.2 To verify that cardholder data is not sent via unencrypted email, perform the following:<br>• Verify existence of a policy stating that VISA cardholder information is not to be sent via unencrypted emails.<br>• Verify that email encryption software is provided to employees, and that its use is strongly encouraged. | | | |
| 4.3 Implement strong cryptography and appropriate key controls to safeguard data during transmission. | | 4.3 Verify that at least 128 bit encryption is used during data transmission. | | | |
| 4.4 Encrypt non-console administrative access. Use technologies such as SSH or VPN. | | 4.4 For the samples of firewalls/routers database servers, and other critical servers (Sampling Note, pg 1), verify that non-console administrative access is encrypted by:<br>• Observing administrators as they log on and determining that SSH (or other encryption method) is invoked before the administrator's password is requested.<br>• Reviewing services and parameter files to determine that telnet and other remote login commands are not available for use. | | | |
| ◊ Refer to CISP Requirement 3.0 for specific actions related to cryptographic solutions and key management. | | | | | |
| Requirement 5: Use and regularly update anti-virus software or programs. | | | | | |
| 5.1 Deploy anti-virus mechanisms on all systems. | Use anti-virus mechanisms on all Microsoft OS and Mail gateways involved in | 5.1 For the samples of database and other critical servers (Sampling Note, page 1) verify that anti-virus software is installed on the systems. | | | |

FIG. 3N

Visa U.S.A. Cardholder Information Security Program (CISP)
Security Audit Procedures and Reporting

| Requirements | Best Practices | Testing Procedures | In Place | Not in Place | Target Date/ Comments |
|---|---|---|---|---|---|
| 5.2 Keep all anti-virus mechanisms current and actively running. Make sure they are capable of generating audit logs. | the transmission or storage of VISA cardholder data. Anti-virus logs should be kept for a minimum of 6 months or a period equal to your company's standard retention policy. | 5.2 To verify that anti-virus software is current, running, and capable of generating logs, perform the following:<br>• Obtain and review the policy requiring updates to anti-virus software and definitions.<br>• Verify that the master installation of the software is enabled for automatic updates and periodic scans, and that the servers examined at 5.1 above have these features enabled.<br>• Verify that log generation is available and enabled and that the logs are being retained in accordance with the company's retention policy. | | | |
| Requirement 6. Restrict access to data by business need-to-know. | | | | | |
| 6.1 Develop a data control policy. Limit access to computing resources and cardholder information to only those individuals whose job requires such access. | | 6.1 Using the sampled firewalls/routers, database servers, and other critical servers (Sampling Note, page 1), obtain a list of all User IDs and their associated access rights, and perform the following:<br>• Confirm via discussions with the security manager that access rights assigned to privileged User IDs are restricted to least privileges necessary to perform the job.<br>• Confirm via examination of authorization forms that all administrators are authorized and have active accounts.<br>• Select a sample of general users and confirm via examination of authorization forms that those users are authorized and have active accounts. | | | |
| 6.2 Establish a mechanism for systems with multiple users that restricts access based on a user's need to know. | | 6.2 Verify there is a written procedure for data control, and that it includes the following:<br>• Coverage of all production operating systems, network components, databases, and applications.<br>• Assignment of privileges to individuals based on job classification and function.<br>• Requirement for an authorization form that is signed by management and specifies required privileges. | | | |

FIG. 30

Visa U.S.A. Cardholder Information Security Program (CISP)
Security Audit Procedures and Reporting

| Requirements | Best Practices | Testing Procedures | In Place | Not in Place | Target Date/ Comments |
|---|---|---|---|---|---|
| Requirement 7: Assign a unique ID to each person with computer access. | | | | | |
| 7.1 Uniquely identify all users before allowing them to access system resources or cardholder information. | Authentication must clearly establish a user's unique identity. An internal employee transfer may result in the employee no longer needing access to cardholder data. | 7.1 For the samples of firewalls/routers, database servers, and other critical servers (Sampling Note, page 1), review user ID listings and verify the following:<br>• Generic ID's are not used except in emergency situations.<br>• Shared IDs for system administration activities and other critical functions do not exist. | | | |
| 7.2 Employ at least one of the methods below to authenticate all internal and external users:<br>• Unique user name and password<br>• Token devices (i.e., SecureID, certificates, or public key)<br>• Biometrics | Repeated system access attempts could mean someone is trying to establish a false identity for illegal system access or use a valid identity in an unauthorized manner. | 7.2 To verify that users are authenticated using unique ID and password for access to the cardholder environment, perform the following:<br>• Document the authentication method(s) used.<br>• For each type of authentication method used and once for each type of server (e.g., firewall, database, application, Web, etc.), perform or observe a test authentication to verify authentication is working as expected. For example, if one factor authentication (user ID and password) is employed, perform a test logon to verify that a user ID and password are required to authenticate access. If SecureID authentication is used, perform a test logon to verify that token pin is required to authenticate access. | | | |
| 7.3 Ensure proper user authentication and password management for non-consumer users: | | 7.3 Verify, via review of procedures and discussions that procedures exist for adding, deleting, and modifying user IDs and access credentials. Perform the following: | | | |
| 7.3.1 Control the addition, deletion, and modification of user IDs, credentials, or other identifier objects. | | 7.3.1 Select a sample of user IDs from sampled firewalls/routers, database servers, and other critical servers (Sampling Note, page 1), and trace these IDs to the authorization forms. Verify the ID's are implemented in accordance with the authorization form (e.g., with privileges as specified, all signatures obtained, etc.). | | | |
| 7.3.2 Immediately revoke accesses of terminated users. | | 7.3.2 Select a sample of employees terminated in the last 6 months, and verify that their IDs have been inactivated or removed. | | | |
| 7.3.3 Distribute password procedures and policies to all users who have access to cardholder information. | | 7.3.3 Select a sample of employees with access to cardholder data, and ask them about their awareness of password procedures. | | | |

FIG. 3P

Visa U.S.A. Cardholder Information Security Program (CISP)
Security Audit Procedures and Reporting

| Requirements | Best Practices | Testing Procedures | In Place | Not in Place | Target Date/ Comments |
|---|---|---|---|---|---|
| 7.3.4 Do not permit group passwords. | | 7.3.4 Review password procedures to verify that group passwords are explicitly prohibited. Interview system administrators to verify that group passwords are not given out even if requested. | | | |
| 7.3.5 Change user passwords at least every 90 days. | | 7.3.5 Inspect system configuration settings to verify that user passwords are required to change at least every 90 days. (In Windows NT, the password maximum age should be set to 90, or in UNIX, the password change interval setting should be set to 90.) | | | |
| 7.3.6 Require a minimum password length of at least 7 characters. | | 7.3.6 Inspect system configuration settings to verify that passwords are required to be at least 7 characters long. (In Windows 2000, Minimum Password Length is set in Account Policy.) | | | |
| 7.3.7 Use passwords containing both numeric and alphabetic characters. | | 7.3.7 Inspect system configuration settings to verify that passwords are required to contain both numeric and alphabetic characters. (In Windows 2000, the password complexity option is enabled in Account Policy.) | | | |
| 7.3.8 Do not allow an individual to submit a new password that is the same as any of the last four passwords he or she has used. | | 7.3.8 Inspect system configuration settings to verify that new passwords cannot be the same as the 4 previously used passwords. (In Windows NT, the password history setting is set to "4".) | | | |
| 7.3.9 Monitor system access attempts. Limit "repeated" attempts by locking out the user ID after a specific number of tries. (The maximum number for system access attempts must not exceed six.) | | 7.3.9 Inspect system configuration settings to verify that user's account is locked out after 6 invalid logon attempts (In Windows 2000, Account Lockout Policy is set in Account Policy). | | | |
| 7.3.10 Set the lockout duration to "forever" until administrator enables the user ID. | | 7.3.10 Inspect system configuration settings to verify that once a user account is locked out, it remains locked until a system administrator resets the account. (In Windows 2000, the Account Lockout Duration, Account Lockout Threshold, and Reset Account Lockout After settings should be set appropriately.) | | | |
| 7.3.11 If a session has been idle for more than 15 minutes, require the user to re-enter the password before disconnecting session/re-activate the terminal. | | 7.3.11 Inspect system configuration settings to verify that system/session idle time out features have been set to 15 minutes. (In Windows 2000, the setting is at "Amount of idle time required before disconnecting session" feature in security options within Group Policy.) | | | |

FIG. 3Q

Visa U.S.A. Cardholder Information Security Program (CISP)
Security Audit Procedures and Reporting

| Requirements | Best Practices | Testing Procedures | In Place | Not in Place | Target Date/ Comments |
|---|---|---|---|---|---|
| 7.3.12 Authenticate all access to any database containing cardholder information. This includes access attempts made by applications, administrators, and all other users. | | 7.3.12 Verify that all database access is authenticated, including that for individuals, applications, and administrators. Also verify that direct SQL queries to the database are prohibited. | | | |
| Requirement 8: Do not use vendor-supplied defaults for system passwords and other security parameters. | | | | | |
| 8.1 Always change the vendor-supplied defaults before you install a system on the network (i.e., passwords, SNMP community strings, unnecessary accounts, etc.). | Vendor-supplied passwords are well known and easily obtained from vendors or the Internet. | 8.1 To verify that default accounts and passwords have been changed, use the samples of firewalls/routers, database servers, and other critical servers (Sampling Note, page 1), and attempt to logon (with system administrator help) to the devices using default vendor-supplied accounts and passwords (e.g., for the Microsoft SQL server, the default password for the SA account is blank. Use vendor manuals and sources on the Internet to find more vendor-supplied accounts/passwords.) | | | |
| 8.2 Develop system configuration standards for all "networks components". Make sure these standards address all known security vulnerabilities and industry best practices. Note: "Network components" include, but are not limited to servers, switches, firewalls, etc. | There are many good sources for security configuration standards, which include discussion of risky services and features, and proper security parameter settings. The Center for Internet Security (www.cisecurity.org) has numerous free benchmarks (best-practice security configurations) and scanning tools for Windows NT and 2000, Solaris, and others (Apache and IIS are in draft form), as well as a Top 20 Scanner to scan for the FBI/SANS Top 20 Vulnerabilities (Scanner at www.cisecurity.org, vulnerabilities at www.sans.org/top20). | 8.2 Evaluate the organization's system configuration standards for network components and critical servers. Verify each item below is included in the standard, and via discussions with the relevant administrator, verify that each item is included when new systems are configured. Also perform additional steps as follows: | | | |
| 8.2.1 Implement only one application or primary function per network component (i.e., one application per server). | | 8.2.1 Only one application or primary function is implemented per server. | | | |
| 8.2.2 Make sure each network component contains the minimum hardware and software it needs to prevent misuse. | | 8.2.2 Each component contains the minimum hardware and software needed to prevent misuse. | | | |
| 8.2.3 Disable all unnecessary services. | | 8.2.3 All unnecessary services are disabled (necessary ones are documented). Obtain and inspect a list of enabled system services/daemons from a subset of the total sample. Verify that the list of enabled services does not contain unnecessary services and that any potentially dangerous ones are justified and documented (e.g. FTP and telnet). | | | |

FIG. 3R

Visa U.S.A. Cardholder Information Security Program (CISP)
Security Audit Procedures and Reporting

| Requirements | Best Practices | Testing Procedures | In Place | Not In Place | Target Date/ Comments |
|---|---|---|---|---|---|
| 8.2.4 Configure system security parameters to prevent misuse. | Also consider SANS at www.sans.org for training, publications, links to other sites, etc. | 8.2.4 System security parameters are configured to prevent misuse. Verify that system administrators and/or security managers have knowledge of common security parameter settings for their operating systems, database servers, and Web servers. Review system configuration standards and verify inclusion of these parameters settings. Select a small sub-sample from the samples of database and other critical servers, and verify that several of the most risky parameters are set appropriately. | | | |
| 8.2.5 Remove all unnecessary functionality, e.g., drivers, features, subsystems, file systems, etc. | | 8.2.5 All unnecessary functionality (e.g., drivers, features, subsystems, file systems, etc.) is removed. Verify necessary functions are documented and are the only ones present on the sub-sample of machines used above. | | | |
| 8.2.6 Enable the audit subsystem in support of Requirement 9. | | 8.2.6 Audit capabilities are enabled on firewalls, routers, mainframe servers, and other critical servers. | | | |
| 8.2.7 Configure the networking subsystems to protect against known attacks. | | 8.2.7 Systems are configured to protect against known attacks. | | | |
| 8.3 Establish a process to identify newly discovered security vulnerabilities. Update your standards to address new vulnerability issues. | | 8.3 Review processes in place to identify new security vulnerabilities, and verify that the process includes updates to the system configuration standards reviewed in 8.2 above as new vulnerability issues are found. | | | |
| Requirement 9: Track all user access to data by a unique ID. | | | | | |
| 9.1 Establish a process for linking all data access activities (especially those with root or administrative privileges) to an individual user of system. | Audit trail files should not be able to be deleted for at least 6 months. No one should be able to delete the files from their original location. Copy the files to a location for retention, and the authorized administrator can delete from there as necessary. | 9.1 Verify, via observation and discussions with the system administrator, that audit trails are enabled and active. | | | |
| 9.2 Implement automated audit trails to reconstruct the following events: | | 9.2 Confirm though inquiry and via cursory review of audit logs for the samples of firewalls/routers, database servers, and other critical servers (Sampling Note, page 4), that audit trails record the following types of events. | | | |
| 9.2.1 All accesses to cardholder data | | 9.2.1 Access to cardholder data | | | |
| 9.2.2 All actions taken by any individual with root or administrative privileges | | 9.2.2 Actions taken by any individual with root or administrative privileges | | | |
| 9.2.3 Access to all audit trails | | 9.2.3 Access to all audit trails | | | |
| 9.2.4 Invalid logical access attempts | | 9.2.4 Invalid logical access attempts | | | |
| 9.2.5 Use of identification and authentication mechanisms | | 9.2.5 Use of identification and authentication mechanisms | | | |

FIG. 3S

Visa U.S.A. Cardholder Information Security Program (CISP)
Security Audit Procedures and Reporting

| Requirements | Best Practices | Testing Procedures | In Place | Not In Place | Target Date/ Comments |
|---|---|---|---|---|---|
| 9.2.6 Initialization of the audit logs | | 9.2.6 Initialization of audit logs | | | |
| 9.2.7 Deletion of objects | | 9.2.7 Deletion of objects | | | |
| 9.2.8 Actions taken in response to the compromise of cryptographic keys | | 9.2.8 Compromise of cryptographic keys | | | |
| 9.2.9 Changes in the custody of keys and devices or media holding keys | | 9.2.9 Changes in the custody of keys and devices or media holding keys | | | |
| 9.2.10 All encryption key management operations | | 9.2.10 All encryption key management operations | | | |
| 9.3 Record the following audit trail entries for each event: | | 9.3 Confirm through inquiry and observation that the audit trail minimally captures the following information. | | | |
| 9.3.1 User identification | | 9.3.1 User identification | | | |
| 9.3.2 Type of event | | 9.3.2 Type of event | | | |
| 9.3.3 Date and time | | 9.3.3 Date and time stamp | | | |
| 9.3.4 Success or failure indication | | 9.3.4 Success or failure indication | | | |
| 9.3.5 Origination of event | | 9.3.5 Origination of event | | | |
| 9.3.6 Identity or name of affected data, system component, or resources | | 9.3.6 Identity or name of affected data, system component, or resources | | | |
| 9.4 Secure audit trails so they cannot be altered in any way. | | 9.4 Verify the following via discussions with the system administrator and cursory review of file permissions:<br>• Only individuals who have a job-related need can view audit trail files<br>• No one has the ability to change or delete current audit trail files. | | | |
| 9.5 Review security, firewall, and server logs at least daily. | | 9.5 Verify that processes are in place to review security logs at least daily, and that follow-up to exceptions is specified. | | | |
| 9.6 Retain your audit trail history for a period that is consistent with its effective use, as well as legal regulations. (An audit history usually covers a period of six months or more.) | | 9.6 Verify that audit log retention policies exist and are implemented, and include log retention for at least 6 months. For the samples of firewall/routers/ database servers, and other critical servers (Sampling Note, page 1), verify that audit logs are available online or on tape for the period of time specified in the policy. | | | |

FIG. 3T

Visa U.S.A. Cardholder Information Security Program (CISP)
Security Audit Procedures and Reporting

| Requirements | Best Practices | Testing Procedures | In Place | Not in Place | Target Date/ Comments |
|---|---|---|---|---|---|
| Requirement 10: Regularly test security systems and processes. | | | | | |
| 10.1 Test security controls, limitations, network connections, and restrictions routinely to make sure they can adequately identify or stop any unauthorized access attempts. | Custom code should be reviewed for security concerns before being placed into production. These code reviewers should be knowledgeable about secure coding techniques as well as things that developers should avoid doing to develop secure applications. Consider sources such as The Open Web Application Security Project at www.owasp.org. Do not display whole credit card numbers on any Web pages – just show the last 4 digits. Per VISA regulations, Incidents Response and Disaster Recovery procedures should include the following: • Immediately notify VISA U.S.A. Fraud Control, through the merchant bank or processor, of any suspected or confirmed loss or theft of material or records | 10.1 Confirm through inquiry that periodic security testing of the devices within the VISA cardholder environment occurs. | | | |
| 10.2 Run internal and external network vulnerability scans at least monthly and after any change in the network configuration (e.g., new system component installations, changes in network topology, firewall rule modifications, or product upgrades). | | 10.2 Inspect output from the most recent network, host, and application vulnerability scans to verify that periodic security testing of the devices within the VISA cardholder environment occurs. Confirm that high level risks identified in the scans are accommodated by remediation plans which: • Outline how and when the risk will be addressed • Specify who has ownership of the system at risk. | | | |
| 10.3 Before promoting custom application code to the production site, review it carefully to identify any potential coding vulnerability. | | 10.3 Confirm that written policies dictates that code reviews are required, are to be performed by individuals other then the originating author of the code (e.g., developer), and that those performing the code reviews have knowledge of secure coding techniques. Confirm that such code reviews are occurring after code changes. | | | |
| 10.4 Perform penetration testing on network infrastructure and applications at least once a year and after any 'significant' infrastructure and application upgrade or modification (e.g., operating system upgrade, sub-network added to environment, web server added to environment, etc.). | | 10.4 Verify that penetration testing is performed on network infrastructure and applications at least annually and after any significant changes to the environment. | | | |
| 10.5 Use network intrusion detection systems to monitor all network traffic and alert personnel to suspected compromises. • Designate specific personnel to be available on a 24/7 basis to respond to unexpected compromise alerts. | | 10.5 Verify the use of network intrusion detection products to monitor and alert personnel of suspected compromises, and confirm existence of related policies and procedures. • Via observation and review of policies, confirm the existence of 24/7 incident response and monitoring coverage. | | | |
| 10.6 Deploy file integrity monitoring to alert personnel to unauthorized modification of critical system or content files. | | 10.6 Verify the use of file integrity monitoring products, and confirm existence of related policies and procedures. | | | |

FIG. 3U

Visa U.S.A. Cardholder Information Security Program (CISP)
Security Audit Procedures and Reporting

| Requirements | Best Practices | Testing Procedures | In Place | Not In Place | Target Date/ Comments |
|---|---|---|---|---|---|
| 10.6.1 Designate specific personnel to be available on a 24/7 basis to respond to reports of unauthorized critical system or content file changes. | that contain account information. • Demonstrate the ability to prevent future loss or theft of account or transaction information; and • Allow VISA U.S.A. or an independent third party acceptable to VISA to verify that ability by conducting a security review. | 10.6.1 Verify via observation and review of policies, existence of 24/7 response for critical system or file changes. | | | |
| 10.6.2 Perform critical files comparisons at least daily (or more frequently if the process can be automated). | | 10.6.2 Verify that critical file comparisons are performed at least daily. | | | |
| 10.7 Be prepared to respond immediately to a system failure. | | 10.7 Verify the existence of a Disaster Recovery Plan and related procedures, and that the plan includes: | | | |
| 10.7.1 Create a business and disaster recovery plan that involves a crisis-management team who can handle all mission-critical decisions, if possible together during a moment of crisis. | | 10.7.1 A crisis-management team to handle all important decisions. | | | |
| 10.7.2 Test the plan at least annually. | A strong incident response capability includes active monitoring where individuals are watching screens for alerts or receive pages vs. passive monitoring where individuals receive emails that are inspected at a later time. | 10.7.2 Testing of the plan at least annually. | | | |
| 10.7.3 Provide adequate training to staff with operational business and recovery plan execution responsibilities. | | 10.7.3 Training for staff with execution responsibilities | | | |
| 10.8 Be prepared to respond immediately to a system breach. | | 10.8 Verify the existence of an Incident Response Plan and related procedures, and that the plan includes: | | | |
| 10.8.1 Create a plan that designates roles and responsibilities in the event of system compromise. Make sure the plan addresses security communication/contract strategies (e.g., informing Visa, law enforcement, internal parties, etc.) | | 10.8.1 Roles, responsibilities, and communication strategies in the event of a compromise. (Visa, law enforcement, and internal parties should all be detailed in the list of those to receive communication in the event of a compromise.) | | | |
| 10.8.2 Test the plan at least annually. | | 10.8.2 Testing of the plan at least annually. | | | |
| 10.8.3 Provide appropriate training to staff with security breach response responsibilities. | | 10.8.3 Training for staff with security breach responsibilities | | | |

FIG. 3V

Visa U.S.A. Cardholder Information Security Program (CISP)
Security Audit Procedures and Reporting

| Requirements | Best Practices | Testing Procedures | In Place | Not in Place | Target Date/ Comments |
|---|---|---|---|---|---|
| 10.9 Make sure media is backed up nightly to adequately facilitate recovery. Store media back-ups in a secure off-site facility, which may be either an alternate third-party or a commercial storage facility. | | 10.9 Review policies and procedures for backups, as well as supporting documentation (backup tape logs, etc.) to verify that backups are performed in accordance with the following: <br>• Full backups are performed nightly, or full backups are performed weekly with nightly incremental backups. <br>• Backup media are stored and transported in a physically secure, fireproof, offsite location. <br>• Backup media are available within a reasonable time (e.g., 4 hours) of a request by an authorized administrator. | | | |
| Requirement 11: Maintain a policy that addresses information security for employees and contractors. | | | | | |
| 11.1 Establish and publish a security policy that: | Educate employees and contractors about their cardholder information security responsibilities through posters, letters, memos, meetings, promotions, etc. | 11.1 Review the information security policy, verify the policy is published, and verify that: | | | |
| 11.1.1 Addresses all CISP requirements | | 11.1.1 The policy addresses all CISP requirements | | | |
| 11.1.2 Reflects your organization's business objectives and risk control standards | | 11.1.2 The information security policy reflects the organization's business objectives. | | | |
| 11.2 Develop daily operational security procedures that are consistent with CISP requirements. | A formalized, documented, enforceable agreement must be maintained between the select merchant or service provider as keeper of cardholder data and any 3rd parties with access to the data. This agreement may be addressed by various means, such as within the provisions of the contracts between these entities, an addendum to a current contract, or an entirely new contract. | 11.2 Review the daily operational security procedures. Verify they are consistent with CISP, and include administrative and technical procedures for each of the CISP requirements. | | | |
| 11.3 Make sure your security policy and procedures clearly define information security responsibilities for all employees and contractors. | | 11.3 Verify that information security policies clearly define information security responsibilities for both employees and contractors. | | | |
| 11.4 Assign to an individual or team the following information security management responsibilities: | | 11.4 Verify that the following information security responsibilities are specifically and formally assigned: | | | |
| 11.4.1 Establish, document, and distribute security policies and procedures. | | 11.4.1 Creating and distributing security policies and procedures. | | | |
| 11.4.2 Monitor and analyze security alerts and information and distribute to appropriate personnel. | | 11.4.2 Monitoring and analyzing security alerts, and distributing information to appropriate personnel. | | | |
| 11.4.3 Establish, document, and distribute security incident response and escalation procedures to ensure timely and effective handling of all situations. | | 11.4.3 Creating and distributing security incident response and escalation procedures. | | | |

FIG. 3W

Visa U.S.A. Cardholder Information Security Program (CISP)
Security Audit Procedures and Reporting

| Requirements | Best Practices | Testing Procedures | In Place | Not in Place | Target Date/ Comments |
|---|---|---|---|---|---|
| 11.4.4 Administer user account and authentication management, including additions, deletions, and modifications resulting from user changes and terminations. | This agreement can be customized to cover the areas relevant to the business performed by the 3rd party. | 11.4.4 Administering user account and authentication management. | | | |
| 11.4.5 Monitor and control all access to data. | In the example of an offsite media storage company, such relevant areas would include contacting the select merchant or service provider if there is any compromise to their data, conducting background checks on all personnel with access to such data, supporting critical information retrieval in the event of a disaster at the select merchant's or service provider's facilities, and using disaster recovery and business continuity controls at the offsite media storage company. Many CISP controls would not be relevant to an offsite storage facility (as part of a CISP review), but those that are relevant to the security and availability of | 11.4.5 Monitoring and controlling all access to data. | | | |
| 11.5 Make all employees aware of the importance of cardholder information security. | | 11.5 Verify the existence of a security awareness program, and that it contains the following components: | | | |
| 11.5.1 Educate employees through posters, letters, memos, meetings, promotions, etc. | | 11.5.1 Multiple methods of communicating awareness (posters, letters, meetings, etc.). | | | |
| 11.5.2 Require employees to acknowledge in writing they have read and understood your company's security policy and procedures. | | 11.5.2 Requirement for employees to acknowledge in writing that they have read and understood the company's information security policy. | | | |
| 11.6 Screen all potential employees to minimize the risk of attacks from internal sources. | | 11.6 Verify that background checks are performed on all potential employees including pre-employment, criminal, credit history, and reference checks. | | | |
| 11.7 Contractually require all associated third parties with access to cardholder data to adhere to CISP data security requirements. At a minimum, the agreement should address: | | 11.7 Review any contracts between the organization and any 3rd parties that handle cardholder data (e.g., backup tape storage facilities, managed service providers such as Web hosting companies or security services providers, or those that receive data for fraud modeling purposes). Verify that the CISP requirements that are relevant to the business relationship between the organization and the 3rd party are included in the contract (see further explanations in the Best Practices column). Specifically verify that contracts address: | | | |
| 11.7.1 Security provisions outlined in the CISP, and any fines and penalties as specified by Visa for a lack of compliance with those provisions. | | 11.7.1 CISP security requirements and any related fines and penalties | | | |

FIG. 3X

Visa U.S.A. Cardholder Information Security Program (CISP)
Security Audit Procedures and Reporting

| Requirements | Best Practices | Testing Procedures | In Place | Not In Place | Target Date/ Comments |
|---|---|---|---|---|---|
| 11.7.2 Ownership by Visa, Acquirer, and Merchants of cardholder information and that it can ONLY be used for assisting these parties in completing a transaction, supporting a loyalty program, providing fraud control services, or for uses specifically required by law. | cardholder data should be in the agreement. Another example would be if the 3rd party had an electronic connection to the select merchant or service provider, then their firewall administration, etc. would become part of the agreement. Consider 3rd party relationships in which VISA cardholder information is processed or transmitted to/from an international entity that is not subject to VISA U.S.A. CISP. These entities are subject to VISA International Account Information Security (AIS). | 11.7.2 Ownership and acceptable uses of cardholder information. | | | |
| 11.7.3 Business continuity in the event of a major disruption, disaster or failure. | | 11.7.3 Business continuity provided by the 3rd party. | | | |
| 11.7.4 Audit provisions that ensure that Visa, or a Visa approved third party, will be provided with full cooperation and access to conduct a thorough security review after a security intrusion. The review will validate compliance with Visa CISP standards for protecting cardholder data. | | 11.7.4 Audit provisions for Visa or Visa-approved entities in the event of a cardholder data compromise. | | | |
| 11.7.5 Third party termination clauses to address compliance with CISP and security of cardholder information during contract terminations and related data transfers. | | 11.7.5 Security of cardholder information during 3rd party contract terminations. | | | |
| Requirement 12. Restrict physical access to cardholder data. | | | | | |
| 12.1 Use appropriate facility entry controls to limit physical access to systems that share or process cardholder data. | | 12.1 Verify the existence of the following physical security controls for each computer room, data center and other physical areas with systems that contain cardholder data:<br>• Verify that video cameras are present in the data centers to monitor systems storing cardholder data.<br>• Observe that consoles for 3 randomly selected systems that store and/or transmit cardholder data are "locked" to prevent unauthorized use.<br>• Verify that network jacks are only enabled when needed by authorized employees. For example, conference rooms used to host visitors should not have network ports enabled with DHCP. | | | |

FIG. 3Y

Visa U.S.A. Cardholder Information Security Program (CISP)
Security Audit Procedures and Reporting

| Requirements | Best Practices | Testing Procedures | In Place | Not in Place | Target Date/ Comments |
|---|---|---|---|---|---|
| 12.2 Develop procedures to help personnel easily distinguish between employees and visitors, especially in areas where cardholder information is accessible. | | 12.2 Procedures to help distinguish between employees and visitors are reviewed at 12.3.2 below. | | | |
| Note: Unless otherwise indicated, "employee" refers to full-time and part-time employees, temporary employees/personnel, and consultants who are "resident" on the entity's site. A "visitor" is defined as a vendor, guest of an employee, service personnel, or anyone who needs to enter the facility for a short duration, usually less than three hours. | | | | | |
| 12.3 Make sure all visitors are: | | 12.3 Verify the following employee-visitor controls are present: | | | |
| 12.3.1 Authorized before entering areas where cardholder data is processed or maintained. | | 12.3.1 Verify the use of ID badges within the company. Verify that a visitor ID badge does not permit unescorted access to physical areas that store cardholder data. | | | |
| 12.3.2 Given a physical token (e.g. badge or access device) that identifies them as non-employees containing a fixed expiration date. | | 12.3.2 Observe people within the facility to verify that 1) ID badges clearly distinguish employees from visitors/outsiders and 2) visitor badges contain a fixed expiration date. | | | |
| 12.3.3 Asked to surrender the physical token before leaving the facility or at the date of expiration. | | 12.3.3 Verify that visitors are asked to surrender their ID badge upon departure or expiration date. | | | |
| 12.4 Use a visitor log to retain a physical audit trail of visitor activity. Retain this log for a minimum of three months. | | 12.4 Verify that a visitor log is in use for physical access to the facility as well as computer rooms and data centers where cardholder information is stored or transmitted. Confirm the log contains the visitor's name, the firm represented, and the employee authorizing physical access, and is retained for at least 3 months. | | | |
| 12.5 Restrict and/or monitor closely visitor access to areas where cardholder information is processed or maintained. | | 12.5 Restrictions and monitoring for visitor access to restricted areas are reviewed at 12.1.1, 12.3.2, and 12.4. | | | |

FIG. 3Z

Visa U.S.A. Cardholder Information Security Program (CISP)
Security Audit Procedures and Reporting

| Requirements | Best Practices | Testing Procedures | In Place | Not In Place | Target Date/ Comments |
|---|---|---|---|---|---|
| 12.6 Physically secure all paper and electronic media (e.g., computer, networking, and communications hardware, telecommunication lines, etc.) that contain cardholder information. | | 12.6 Review the procedures and processes in place for protecting all paper and electronic media that contains cardholder data. Verify that, in addition to paper and electronic media in computer rooms and data centers, the process includes controls for paper, CDs and disks in employee desks and open workspaces, and PC hard drives. | | | |
| 12.7 Maintain strict control over the internal or external distribution of any kind of media that contains cardholder information. | | 12.7 Verify that a policy exists to control distribution of cardholder information, covers all distributed media including that distributed to individuals, and that this policy requires the following: | | | |
| 12.7.1 Label the media as "confidential." | | 12.7.1 All media should be labeled as "confidential." | | | |
| 12.7.2 Send the media via secured courier or a delivery mechanism that can be accurately tracked. | | 12.7.2 All media sent outside the facility is logged and authorized by management, and sent via secured courier or other delivery mechanism that can be tracked. | | | |
| 12.8 Ensure management approves all media that is moved from a secured area (especially when media is distributed to individuals). | | 12.8 Select a recent sample of 3 days of offsite media tracking logs (see 12.7a above) and verify the presence in the logs of tracking details and proper management authorization. | | | |
| 12.9 Maintain strict control over the storage and accessibility of media that contains cardholder information. | | 12.9 Verify that a policy exists to control storage and maintenance of hardcopy and electronic media, and that this policy requires periodic media inventories. Verify related processes by performing the following: | | | |
| 12.9.1 Properly inventory all media and make sure it is securely stored. | | 12.9.1 Review supporting documentation to verify that periodic media inventories are performed. | | | |
| 12.9.2 Implement data retention and disposal policies and procedures for all media containing cardholder information. | | 12.9.2 Observe storage containers for information to be destroyed, verify that containers are secured. For example, verify that a to be shredded container has a lock preventing access to the contents. Data retention and destruction procedures reviewed in 12.10 below and at Testing Procedure 3.1. | | | |
| ♦ Refer to CISP Requirement 3.0 for specific actions and timeframes related to cardholder information retention and disposal. | | | | | |
| 12.10 Destroy media containing cardholder information when it is no longer needed for business or legal reasons. | | 12.10 Verify that a policy exists for periodic media destruction, especially with respect to cardholder data. Verify that the procedure requires the following: | | | |
| 12.10.1 Shred or incinerate hardcopy materials. | | 12.10.1 Shredding or incineration of hardcopy materials. | | | |

FIG. 3AA

Visa U.S.A. Cardholder Information Security Program (CISP)
Security Audit Procedures and Reporting

| Requirements | Best Practices | Testing Procedures | In Place | Not in Place | Target Date/Comments |
|---|---|---|---|---|---|
| 12.10.2 Purge, degauss, shred, or otherwise destroy electronic media so that cardholder data cannot be reconstructed. | | 12.10.2 Destruction of electronic media beyond recovery by using a military wipe program to delete files, degaussing, or otherwise physically destroying the media | | | |

FIG. 3AB

Visa U.S.A. Cardholder Information Security Program (CISP)
Security Audit Procedures and Reporting

Attachment A

Visa USA Cardholder Information Security Program Requirement #3: "Protect stored data"

Encryption Clarification

As merchants and service providers work to ensure compliance with the "Digital Dozen," Visa has been made aware of the need to further clarify the requirement to encrypt stored data.

The intent of the requirement is to protect stored cardholder information. While strong encryption (PGP or Triple-DES and associated key management practices and procedures) may be the implied recommendation, Visa is aware that this technique may not be achievable in some environments, and that acceptable alternatives, including other encryption or storage mechanisms that achieve this same objective, need to be articulated.

Baseline Clarifications

- The MINIMUM account information that needs to be encrypted is the Visa account number and expiration date. *(Note that CVV2 data must not be retained in any zone.)*
- The term "encryption" refers to any of several techniques used to render account information unreadable.
- Account numbers must NEVER be stored in the clear on the same webserver that is connected to the Internet (i.e., in the DMZ).

Acceptable Practices

For account information accessible from the Internet, any of the following approaches are being used to secure the account number and expiration date:

- One-way ciphers (hashed indexes), such as SHA-1, but not MD5
- Truncation
- Simple ciphers
- Index tokens and PADs, with the PADs being securely stored
- Strong cryptography, such as PGP or Triple-DES, with associated key management processes and procedures If encryption techniques cannot be used, account information must be isolated from the Internet in a separate database not resident on systems directly connected to the Internet. Ideally, the database should be resident on back-end computers behind an internal firewall (not in the DMZ.) One acceptable practice would be to separate account information from sales data on the Web server and to store the account information on the mainframe, offline, or in a secure zone.

FIG. 3AC

Visa U.S.A. Cardholder Information Security Program (CISP)
Security Audit Procedures and Reporting Attachment B Visa USA Cardholder Information Security Program Requirement #3: "Protect stored data"

Data Segregation Mechanisms

As service providers work to ensure compliance with the Visa U.S.A. Cardholder Information Security Program (CISP), Visa has been made aware of the need to further clarify the sub-requirement to segregate merchants' stored data.

The intent of this sub-requirement is to mitigate the risk in the event an entity is compromised. A service provider environment hosts numerous customer data. An attack on one customer is an attack on all. By separating one customer's data from another, the number of credit cards that a hacker could potentially compromise in an attack is limited. This document will discuss best practices in Internet commerce security and Visa's recommendations for segregating merchant information.

Internet Commerce:
At a minimum, all service providers must implement the following practices for their e-commerce environment:
- Implement multiple layers of firewall (i.e., separate external and internal network)
- This database that stores merchant and cardholder information must not reside on the same network segment as the web servers (i.e., DMZ). This database must be placed in a secured zone.
- To further protect merchant and cardholder information, we recommend implementing additional databases to push sensitive information from the main databases (i.e., account numbers and expiration date) onto this database. This database must be placed in a secured zone.
- All CISP requirements must be implemented on these systems.

Additionally, these guidelines should be followed to protect merchant and cardholder information, whether or not physical or logical segregation is implemented.
- Access to data should be restricted by business need-to-know. Apply the principle of "least privilege" restricting data based on a user's need to know. For systems with multiple users, a mechanism should be established that restricts access based on a users need to know.
- Audit direct access to tables. Use stored procedures, and views to provide a shield between the site and actual cardholder information.
- A web-application that accesses a database SHOULD NOT use an administrative account, which can read and write all data and make changes in the databases schema. The account should be limited to only the access rights and privileges needed to perform the functions of the site.
- Each e-Commerce entity should have a separate database account with access limited to that e-Commerce entity's cardholder data.
- The web-application should not store the credentials for e-Commerce entities with databases accounts. The e-Commerce entity would provide the credentials that would then be passed through to the databases.

Segregation of Merchant Information:
Physical separation of data is the strongest segregation mechanism for securing stored data, however if you cannot accomplish physical segregation, at a minimum there should be a logical separation of data.

1) Physical data segregation. Practices include:
   - Completely separate network for each merchant.
   - If separate network cannot be met, implement separate backend servers that store merchant information.
2) Logical data separation. Practices include:
   - Use separate merchant tables to store cardholder information. A service provider storing cardholder data for multiple e-Commerce entities should separate each e-Commerce entity's cardholder data and separate cardholder lookup or transactional tables.

FIG. 5A

Security Assessment Questionnaire

| | Question 62 | 1st Ranking | 2nd Ranking 64 | Risk Cost 66 |
|---|---|---|---|---|
| 1 | Do you have a comprehensive Information Security Policy? | Medium | Medium | 2 |
| 2 | If so, does the Information Security Policy contain procedures for identifying, protecting, and securely disposing cardholder data? | Medium | Low | 1 |
| 3 | If so, are all employees with access to cardholder data required to read and sign the Information Security Policy? | Medium | Low | 1 |
| 4 | Do you have a central point of contact for Information Security? | | Low | 1 |
| 5 | If so, what is the name of the point of contact? | | | No score |
| 6 | Do you follow a 'kneed-to-know' policy for access to cardholder data that restricts the data to only those who absolutely require it? | Medium / High | Medium | 2 |
| 7 | Do all of your systems that access, process, or store cardholder data have access controls that require a user to submit a unique user ID and unique password before the system allows access to cardholder data? | Medium / High | High | 10 |

FIG. 5B

| | | | |
|---|---|---|---|
| 8 | Are all passwords required to be complex -- with a combination of upper case, lower case, and numeric characters? | Medium | Medium | 2 |
| 9 | Are all non-consumer users required to change their password every 90 days? | Medium | Medium | 2 |
| 10 | Are users (consumer or non-consumer) allowed to submit a new password that is the same as a previous password? | Medium | Medium | 2 |
| 11 | Do you place controls on all systems that process, store, or access cardholder data, such that accounts are temporarily blocked after no more than six unsuccessful non-consumer login attempts? | High | High | 10 |
| 12 | Do you track the actions of each user on all systems that process, store, or access cardholder data systems? | Medium | Medium | 2 |
| 13 | If so, do your tracking methods allow you to regularly review who accesses cardholder data, and what they do? | Medium / High | Medium | 2 |
| 14 | If so, are the audit trails secured in a way that they cannot be tampered with? | Medium | Medium | 2 |
| 15 | Are all of your Internet-accessible e-commerce networks protected by a properly configured firewall? | High | High | 10 |
| 16 | Are firewalls used internally to separate networks of different security levels? | High | Medium | 2 |

FIG. 5C

| | | | | |
|---|---|---|---|---|
| 17 | Is your firewall and router configured to conform to documented security standards? | High | Medium | 2 |
| 18 | Are modems connected to the internal systems or DMZ systems? | High | High | 10 |
| 19 | Are internal network addresses hidden from the internet -- by the use of NAT or PAT on a gateway device? | Medium | Medium | 2 |
| 20 | Are your databases containing cardholder data on separate systems from the internet accessible systems? | | | No score |
| 21 | Is any critical information stored on web servers? | Medium | Medium | 2 |
| 22 | Do you encrypt the cardholder data stored in your databases? | Medium | Medium | 2 |
| 23 | Is your encryption method at least 128-bit triple DES or another current industry standard? | | Medium | 2 |
| 24 | Is CVV2 data stored in the database? | High | High | 10 |
| 25 | Do you encrypt cardholder data between end user customers and your servers prior to transmission over the Internet? | High | High | 10 |

FIG. 5D

| | | | | |
|---|---|---|---|---|
| 26 | Do you explicitly prohibit all transmission of unencrypted cardholder data (via email, FTP, or other means)? | High | High | 10 |
| 27 | Do you control the access to cryptographic systems? | Medium | Medium | 2 |
| 28 | If so, do you maintain controls that require two persons for access to cryptographic systems? | | Low | 1 |
| 29 | Are all passwords on network devices and systems encrypted? | Medium | Medium | 2 |
| 30 | Do you regularly apply security patches to Applications and Operating Systems on all systems that process, store, or access cardholder data? | High | High | 10 |
| 31 | If so, how often do you check for new security-related patches? | High | High | 10 |
| 32 | Do you regularly monitor and review security alerts, and distribute them to the appropriate personnel? | Medium | Medium | 2 |
| 33 | Do you regularly remove unneeded data and unused applications, as well as default and inactive accounts from all systems that process, store, or access cardholder data? | Medium | Medium | 2 |
| 34 | Have you hardened the operating system and removed unnecessary services for all Internet accessible systems? | High | High | 10 |

FIG. 5E

| | | | | |
|---|---|---|---|---|
| 35 | Has the application code been tested for vulnerabilities prior to entering production? | Medium / High | Medium | 2 |
| 36 | Are all systems that that process, store, or access cardholder data protected with anti-virus protection measures? | High | High | 10 |
| 37 | Have anti-virus systems been updated with the latest signature files? | Medium | Medium | 2 |
| 38 | Do you have physical access controls protecting your Systems that that process, store, or access cardholder data and database systems? | | Medium | 2 |
| 39 | Is access to the data center restricted and closely monitored? | Medium | Medium | 2 |
| 40 | Are visitors, including vendors, permitted to enter data centers or access sensitive systems without an escort? | High | High | 10 |
| 41 | Are visitors asked to sign out and turn in their badge or tag before leaving the building? | Medium | Medium | 2 |
| 42 | Are all paper and electronic media (e.g. computer, networking, and communications hardware, telecommunications lines, etc.) containing cardholder information located in a physically secure environment? | High | High | 10 |
| 43 | Are all media devices properly inventoried and securely stored? | High | High | 10 |

FIG. 5F

| | | | |
|---|---|---|---|
| 44 | Have all discarded media been erased or destroyed using a formal procedure that ensures the complete deletion of all sensitive data? | Medium | Medium | 2 |
| 45 | Do you regularly test your information security control mechanisms? | Medium | Medium | 2 |
| 46 | Are vulnerability assessments performed on the internal and external network on a monthly basis and after updates and/or upgrades to systems? | Medium | Medium | 2 |
| 47 | Is all critical data backed up on a daily basis | Medium | Medium | 2 |
| 48 | Do you have a documented security incident response plan? | Medium | Medium | 2 |
| 49 | Are employees with access to cardholder data permitted to begin work prior to completion of a background investigation (including credit and criminal record checks)? | Medium | Medium | 2 |
| 50 | Are third parties with access to cardholder data required to execute a legal agreement to follow the security standards of regular employees? | Medium | Medium | 2 |

FIG. 8A

| HIPAA Security Category | Standard Section | Question Number | Main or Followup MQ | I&M Category | Question | Response | Recommendation |
|---|---|---|---|---|---|---|---|
| Administrative Safeguards | Workforce Security 164.308(a)(3) | 1 | MQ | 01 INFOSEC Documentation | Does the covered entity have a written security policy? | No / Yes / Yes undocumented | Implement policies and procedures to ensure that all members of its workforce have appropriate access to electronic protected health information and to prevent those workforce members who do not have access authorization from obtaining access to electronic protected health information. Maintain a written (which may be electronic) record of all required actions, activities, or assessments. |
| Administrative Safeguards | Workforce Security 164.308(a)(3) | 2 | FQ | 01 INFOSEC Documentation | Does the policy identify what information, including electronic protected health information, it is most important to protect? | No / Yes / Yes undocumented | Identify the information that is important to protect, including electronic protected health information. Maintain a written (which may be electronic) record of all required actions, activities, or assessments. |
| Administrative Safeguards | Assigned Security Responsibility 164.308(a)(2) (R) | 3 | FQ | 01 INFOSEC Documentation | Does the policy identify a security official responsible for the development and implementation of security policies and procedures? | No / Yes / Yes undocumented | Identify the security official who is responsible for the development and implementation of the security policies and procedures for the covered entity. Maintain a written (which may be electronic) record of all required actions, activities, or assessments. |
| Administrative Safeguards | Assigned Security Responsibility 164.308(a)(2) (R) | 4 | FQ | 01 INFOSEC Documentation | Who is the Security Official? | No / Yes / Yes undocumented | Identify the security official who is responsible for the development and implementation of the security policies and procedures for the covered entity. Maintain a written (which may be electronic) record of all required actions, activities, or assessments. |
| Administrative Safeguards | | 5 | FQ | 01 INFOSEC Documentation | Does the policy identify the steps to be taken if there is a security breach? | No / Yes / Yes undocumented | Maintain a written (which may be electronic) record of all required actions, activities, or assessments. |
| Administrative Safeguards | Security Management process 164.308(a)(1) Sanction Policy(R) | 6 | FQ | 01 INFOSEC Documentation | Does the policy address enforcement procedures that identify the sanctions associated with failure to comply with covered entity security policies and procedures? | No / Yes / Yes undocumented | Apply appropriate sanctions against workforce members who fail to comply with the security policies and procedures of the covered entity. Maintain a written (which may be electronic) record of all required actions, activities, or assessments. |

FIG. 8B

| | | | | | |
|---|---|---|---|---|---|
| Administrative Safeguards | Assigned Security Responsibility 164.308(a)(2) (R) | ? | FQ | 01 INFOSEC Documentation | Does the security policy identify all individuals responsible for implementing that policy and what their duties are? | No / Yes Yes undocumented | Identify others responsible for implementing security policy and documents their duties in the security policy. / Maintain a written (which may be electronic) record of all required actions, activities, or assessments. |
| Administrative Safeguards | Security management process 164.308(a)(1) Sanction Policy(R) | 8 | FQ | 01 INFOSEC Documentation | Is the policy known by all individuals who have the responsibility for implementing that policy? | No / Yes Yes undocumented | Ensure that all individuals are aware of their responsibilities for implementing security policy. / Maintain a written (which may be electronic) record of all required actions, activities, or assessments. |
| Administrative Safeguards | Security management process 164.308(a)(1) Risk Management (R) | 9 | FQ | 01 INFOSEC Documentation | Have sufficient security measures been implemented to reduce risks and vulnerabilities to a reasonable and appropriate level? | No / Yes Yes undocumented | Implement security measures sufficient to reduce risks and vulnerabilities to a reasonable and appropriate level / Maintain a written (which may be electronic) record of all required actions, activities, or assessments. |
| Policies, Procedures and Organizational Requirements | Policies and Procedures 164.316(a) (R) | new | FQ | 01 INFOSEC Documentation | Have reasonable and appropriate policies and procedures been implemented to comply with the standards, implementation specifications, or other security and safeguard requirements of the HIPAA Security and Privacy Standards? | No / Yes Yes undocumented | Implement reasonable and appropriate policies and procedures to comply with the standards, implementation specifications, or other requirement of this HIPAA security standard. / Maintain a written (which may be electronic) record of all required actions, activities, or assessments. |
| Policies, Procedures and Organizational Requirements | Documentation 164.316 (b) Time Limit (R) | new | FQ | 01 INFOSEC Documentation | Do you have a process to retain HIPAA infosec documentation required for 6 years from creation date or effective date, whichever is later? | No / Yes Yes undocumented | Retain the documentation required for 6 years from the date of its creation or the date when it last was in effect, whichever is later. / Maintain a written (which may be electronic) record of all required actions, activities, or assessments. |
| Policies, Procedures and Organizational Requirements | Documentation 164.316 (b) Availability (R) | new | FQ | 01 INFOSEC Documentation | Does your organization make infosec documentation available to those persons responsible for implementing the procedures to which the documentation pertains? | No / Yes Yes undocumented | Make documentation available for implementing the procedures to which the documentation pertains. / Maintain a written (which may be electronic) record of all required actions, activities, or assessments. |

FIG. 8C

| | | | | | |
|---|---|---|---|---|---|
| Policies, Procedures and Organizational Requirements | Documentation 164.316 (b) Updates (R) | new | PQ | G1 INFOSEC Documentation | Does your organization review, update documentation periodically, and update as needed, in response to environmental or operational changes affecting the security of the electronic protected health information? | No | Review documentation periodically, and update as needed, in response to environmental or operational changes affecting the security of the electronic protected health information. |
| Physical Safeguards | Workstation Use 164.310(b) (R) | 10 | MQ | G1 INFOSEC Documentation | Is there an acceptable use policy? | Yes undocumented | Maintain a written (which may be electronic) record of all required actions, activities, or assessments. |
| | | | | | | No | Implement policies and procedures that specify the proper functions to be performed, the manner in which those functions are to be performed, and the physical attributes of the surroundings of a specific workstation or class of workstations that can access electronic protected health information. |
| | | | | | | Yes Yes undocumented | Maintain a written (which may be electronic) record of all required actions, activities, or assessments. |
| Administrative Safeguards | Security management process 164.308(a)(1) Risk Analysis (R) | 11 | MQ | G2 INFOSEC Roles and Responsibilities | Are there appointed owners of each of the information assets? | No Yes undocumented | |
| Administrative Safeguards | Security management process 164.308(a)(1) Risk Analysis (R) | 12 | MQ | G2 INFOSEC Roles and Responsibilities | Have accurate and thorough risk assessments been performed on the systems handling electronic protected healthcare information assets? | No | Conduct an accurate and thorough assessment of the potential risks and vulnerabilities to the confidentiality, integrity, and availability of electronic protected health information held by the covered entity. |
| Administrative Safeguards | Security management process 164.308(a)(1) Risk Analysis (R) | 13 | PQ | G2 INFOSEC Roles and Responsibilities | Has the assessments occurred within the previous 12 months? | Yes Yes undocumented | Maintain a written (which may be electronic) record of all required actions, activities, or assessments. |
| Administrative Safeguards | Security management process 164.308(a)(1) Risk Management (R) | 14 | PQ | G2 INFOSEC Roles and Responsibilities | Have vulnerabilities identified in the assessments been corrected? | No Yes Yes undocumented | Risk analysis should be conducted annually. Remediate identified vulnerabilities. |
| Administrative Safeguards | Security management process 164.308(a)(1) Risk Management (R) | 15 | PQ | G2 INFOSEC Roles and Responsibilities | Are there remaining vulnerabilities that have not been addressed? | No | Maintain a written (which may be electronic) record of all required actions, activities, or assessments. |
| | | | | | | Yes Yes undocumented | Document decision to accept residual risk or establish plan to remediate remaining. Maintain a written (which may be electronic) record of all required actions, activities, or assessments. |

FIG. 8D

| Administrative Safeguards | Evaluation (A. 308(a)(8)(i)) | new | MQ | 02 INFOSEC Roles and Responsibilities | Have you administered an gap analysis (hands-on and hands-off) which establishes the extent to which your security policies and procedures initially meet the HIPAA security requirements? | No<br><br>Yes<br>Yes undocumented | Perform a gap analysis (both technical and nontechnical evaluation) that establishes the extent to which an entity's security policies and procedures meet the HIPAA security requirements.<br><br>Maintain a written (which may be electronic) record of all required actions, activities, or assessments. |
|---|---|---|---|---|---|---|---|
| Administrative Safeguards | Evaluation 188.308(a)(8) (8) | new | MQ | 02 INFOSEC Roles and Responsibilities | Have you administered a follow-up gap evaluation (hands-on and hands-off) which establishes the extent to which your security policies and procedures continue to meet HIPAA security requirements in light of environmental or operational changes in your systems or network? | No<br><br>Yes<br>Yes undocumented | Perform a periodic technical and nontechnical gap evaluation that establishes the extent to which an entity's security policies and procedures meet the HIPAA security requirements.<br><br>Maintain a written (which may be electronic) record of all required actions, activities, or assessments |

METHODS AND SYSTEMS FOR ASSESSING AND ADVISING ON ELECTRONIC COMPLIANCE

FIELD OF THE INVENTION

The present invention relates to methods and systems of assessing electronic compliance with various standards, and specifically to methods and systems of assessing electronic compliance with regulatory or security standards using a computer system, and more specifically to methods and systems of assessing electronic compliance with regulatory or security standards via a graphical user interface. The present invention also relates to methods and systems of evaluating compliance with regulatory or security standards in a graphical user interface using a question and answer prompt in conjunction with a scanning engine, to provide a user with their individual level of compliance.

BACKGROUND OF THE INVENTION

Individuals with responsibility for securing information often deploy measures that are solution-centric, such as firewalls, encryption software, and password tokens, without fully understanding how these measures affect the overall security posture of their organization. The lack of documented security standards and regulations addressing information security issues has created an environment in which security solutions and architecture are driven by "industry-best standards" and may even consist of ad-hoc patches to solve specific security problems.

Individuals with responsibility for securing information often deploy measures that are solution-centric, such as firewalls, encryption software, and password tokens, without fully understanding how these measures affect the overall security posture of their organization. The lack of documented security standards and regulations addressing information security issues has created an environment where security solutions or computer system architecture are driven by "industry-best standards." In some instances the solutions may even be ad-hoc patches designed to solve individual or specific security problems.

Recently, a number of initiatives have been proposed to address the lack of standards for information assurance (IA). These regulatory initiatives include the Gramm-Leach-Bliley (GLB) Act and the Health Insurance Portability and Accountability Act (HIPAA) which set forth requirements for protecting personal financial and medical information. In addition, standards for corporate security are constantly being rewritten, resulting in private organizations having no operational requirements with which to implement robust security practices. Moreover, the fact that a corporation's information assets and critical business functions are increasingly reliant upon an electronic infrastructure, means that every organization must answer to regulators, stockholders, customers and partners when formulating and implementing an Information Assurance and Security Strategy and Program to safeguard such assets and functions.

To accommodate both internal and external standards and security requirements, as well as applicable laws, organizations must go through a process of translating their business needs in regard to addressing the IA standards, into a security policy statement detailing how that company will meet and comply with those standards. Then that same company must implement a security program that actually complies with its security policies. Moreover, the company must routinely monitor and validate that its implemented security program is effective and continues to comply with the goals of its security policy as the requirements for IA change, and its computer network information infrastructure evolve.

There are various ways a corporation can attempt to assess its compliance with regulatory standards and/or security policies. For example, a consultant can question a corporation's information officer to determine what measures that corporation has in place to safeguard its electronic information assets. Or the corporation can employ automated tools to perform certain aspects of the assessment. Some commercially available automated tools include CyberCop Scanner, the Security Administrator Tool for Analyzing Networks (SATAN Suite), and Internet Security Systems' ISS Scanner. Although these automated products can scan computer infrastructures for vulnerabilities by actively probing particular aspects of the user's computer network, these public domain applications do not provide an analysis that is related to specific regulatory standards or specific security policies or requirements. Moreover, the existing automated tools lack an analytical mechanism to manage the results of such computer infrastructure scans. Another shortcoming of commercial, as well as open-source scanners, is that the reporting capabilities of these products are immature and require highly technical personnel to analyze and make sense out of the results.

Therefore, it would be advantageous if a system and method existed which provided for the automated prompting for and collection of policy and administrative information via an automated questionnaire. It would also be advantageous if the questionnaire was created specifically for the type of regulation or security policy employed by the user. It would also be advantageous if the questionnaire could be stored in a database and used with similarly situated users. It would also be advantageous if a system and method existed which contained an analytical mechanism that devised assessments of a user's computer network based on that input data. As a corollary to the Policy Questionnaire, it would also be advantageous if a system and method existed which performed a supplemental assessment by remotely scanning the user's network, thereby generating data which not only validates the Questionnaire input, but also provides additional assessment of the user's network in terms of vulnerabilities, or in terms of compliance with certain regulatory standards and security policies or operating criteria. It would also be advantageous if the generated data could be presented to the user in various formats.

SUMMARY OF THE INVENTION

In conjunction with the filing of this application, there is simultaneously filed a co-pending application entitled "Apparatus and Method For Network Vulnerability Detection and Compliance Assessment," which the U.S. Patent Office assigned Ser. No. 10/401,040, and which is expressly incorporated herein in its entirety. The present invention may help to alleviate the problems discussed above and may provide a cost-effective and orderly method for assessing a user's network and compliance with any number of regulations, policies or standards. In particular, the present invention may aid in providing a means for assessing a user's compliance with either any type of regulatory standard, security policy or operating criteria. For example, the present invention may permit a security manager to ascertain vulnerabilities in an existing network. The security manager may be able to accomplish this by performing steps associated with the method of the present invention, or by using the system and apparatus of the present invention. Such a system and apparatus may, for example, be a computer system.

In a specific embodiment, the present invention may include a system and method for assessing or evaluating a computer system's compliance with a regulatory scheme, such as HIPAA, by obtaining that desired regulatory scheme, developing inquiries based on that regulatory scheme, and directing those inquiries to the user so as to elicit responses from the user. Importantly, the inquiries directed at the user can be derived from any source. For example, the inquiries can be formatted and structured so as to determine whether a certain company's computer system complies with the Credit Card Association's security requirements regarding hardware and software used in credit card transactions over the Internet, as well as storing credit card holder's information. Or the inquiries could be formatted and structured so that they determine whether or not the user's computer system complies with the security policy of the GLB Act, which requires for example, that financial institutions ensure the security and confidentiality of customer records and information.

Similarly, the inquiries could be formatted and structured to determine the compliance of a user's computer system with the regulations required by HIPAA on dealing with patient privacy. Once a set of questions is structured and formatted for any given type of industry, i.e., financial, healthcare, utilities, U.S Government, etc., it could be stored in a database for use with future users dealing with similar industries. Once formatted and structured, the questionnaire for a given user can be provided on-line, with the responses to each question being stored in a database.

An apparatus according to the present invention may be described as a network and application assessor. However, the actual functions performed by the network assessor may include scanning the network, as well as assessing the network and associated applications for compliance with certain operational frameworks. The questions directed to the user can also be used to aid in that scan, or the input may be automated. Such input includes the type of operational framework the user's network is operating under. These operational frameworks include regulatory standards, security policies or operating criteria. Other input that the network assessor will accept consists of information relating to the IP (Internet Protocol) addresses of various servers, routers, gateways, or other hardware devices on the user's network. Additionally, the inputs to the network assessor may include information relating to the types of policy and administrative issues that the user wishes to have investigated, including, for example, policy shortcomings, operational procedure shortcomings, operating system vulnerabilities, network communication vulnerabilities, and denial of service vulnerabilities Similarly, the input to the network scanner may include information relating to custom software applications and their associated vulnerabilities that the user wants the apparatus of the present invention to address during the scan, as well as the frequency with which the user would like the scan to be performed. Other input information may include the time of day at which the user would like the scan to occur or not occur (as in the case of peak business hours or business periods like the holidays). The timing of the scan may be of particular importance if the network scanner is testing the user's network's vulnerabilities to denial of service attacks.

Operating system vulnerabilities that the network scanner can test for may also include providing too much information, or allowing too high a level of privileges to users, in particular to unauthenticated users. Network communication vulnerabilities which the network scanner can test for may include susceptibility to sniffing, spoofing, or probing. Denial of service vulnerabilities which the network scanner can test for may include vulnerabilities to specific forms of denial of service, and also to the ability of employing denial of service attacks to disable interrelated security software or hardware.

One way that data may be input into a network assessor may be through the use of a customized questionnaire. Such a questionnaire may be provided on a traditional paper medium, or may be provided in an electronic format, for example, through an HTML interface. Once sufficient data has been gathered and verified, the data input into the network assessor may be provided to a network scanner module. This network scanner module then begins its assessment and analysis of the user's network. This may include a wide variety of tasks. For example, the network scanner module may attempt to perform a port scan of an Internet-visible system, or it may listen to packets on a local network in order to attempt to detect passwords or other sensitive data being passed over the user's network. Similarly, the network scanner module may attempt to authenticate itself to the user's system using that system's anticipated default settings, or it may attempt to read the media stored on the accessible systems, and it may attempt to communicate with the user's system that are not visible by using a spoofing technique, such as forging header information.

In order to accomplish one or more of these assessment or scanning tasks, the network scanner module may interface with or incorporate a number of network security tools. Once the network scanning is complete and the data characterizing the operating environment of the user's network is stored in the assessment module's database, the inventive system may perform a preliminary analysis based on that data as well as on the information input by the user.

When the inventive system has completed its assessment, or even while it is completing its assessment, the inventive system may employ a report generator to generate a report that identifies the results of the inventive system's investigation. This generated report may include, for example, the direct output from each tool used, or the generated report may preferably provide the output in a manner that is uniform and easy to understand.

For example, the program may classify and briefly list each of the potential vulnerabilities identified by the inventive system, and may associate an intuitive descriptor such as "low risk," "medium risk," "high risk," "informational risk," or "administrative risk" with each identified vulnerability. Severity of these risk levels may be further defined. For example, "high risk" may refer to vulnerabilities that could result in the user's system being immediately compromised, which, therefore, should be addressed immediately by the user. "Medium risk" may refer to vulnerabilities that could potentially result in information or system compromise, but which do not warrant immediate attention. "Informational risk" may be a specific category of "medium risk" relating to vulnerabilities that could potentially result in information compromise. "Low risk" (which may be synonymous with administrative risk) may refer to problems or warnings, such as a system configuration that might reveal information that might aid an attacker in their attempt to compromise the user's system or that would otherwise be of reconnaissance interest.

The report may also include, for example, suggestions on how to solve the identified vulnerabilities. If the report is provided as an HTML page, the page may contain links to security patches for the operating systems and/or other software identified either by the user or by the network security testing procedure. In addition, the report may be provided as an e-mail alert, particularly if the user has selected a periodic assessment of network security.

An object of the present invention is to provide an a method of determining compliance with an operating framework, such as a regulatory policy or security scheme or published scheme including, for example, obtaining a regulatory scheme for a given transaction; developing inquiries to elicit a user's response based upon the regulatory scheme; generating scan parameters based upon the responses to the inquiries; scanning an electronic system using the scan parameters; and providing an assessment regarding compliance with the regulatory scheme.

Another object of the present invention includes a computer system for providing users with the ability to determine compliance with an operating framework, including, for example, a set regulatory or security scheme; a means for providing inquiries to a user; a means for creating a decision tree architecture; a means for scanning another computer system for system vulnerabilities; at least one scanning tool; a database for recording data generated by the means for scanning; and an interface for displaying the data contained in the database.

BRIEF DESCRIPTION OF THE DRAWINGS

FIG. 3 illustrates a representation of a security standard for a financial institution. FIG. 3 refers to FIG. 3A through FIG. 3AC in the drawings.

FIG. 5 illustrates the weighting of the various responses in a self assessment questionnaire. FIG. 5 refers to FIG. 5A through 5F in the drawings.

FIG. 8 illustrates an exemplary questionnaire within a HIPAA operating framework. FIG. 8 refers to FIG. 8A through FIG. 8D in the drawings.

DETAILED DESCRIPTION OF THE INVENTION

Figure 1:
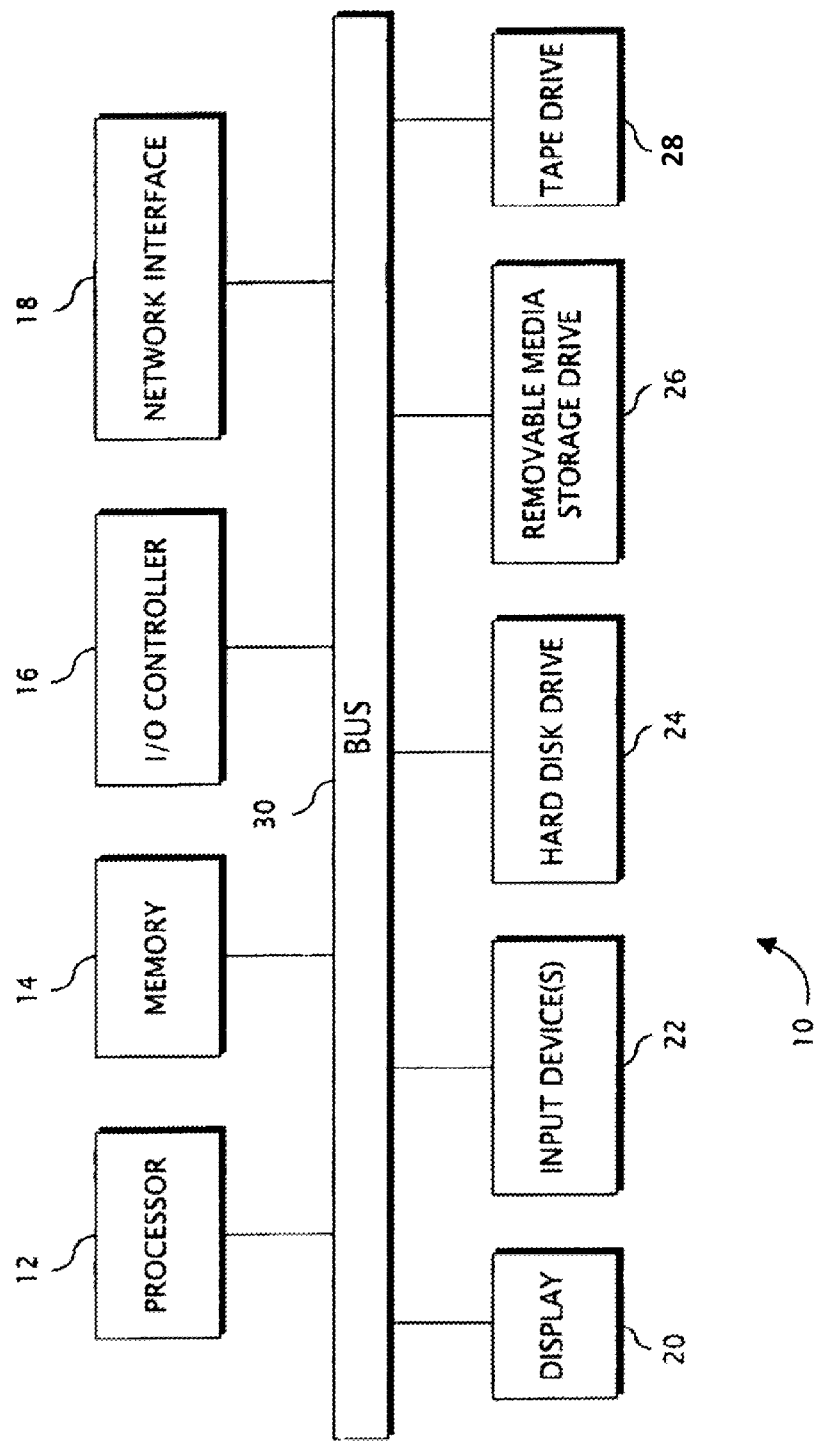
FIG. 1 illustrates a diagram depicting a general-purpose computer system that may be used in conjunction with the present invention.

It is to be understood that the terminology used herein is for the purpose of describing particular embodiments only, and is not intended to limit the scope of the present invention which will be limited only by the appended claims.

It must be noted that as used herein and in the appended claims, the singular forms "a," "an," and "the" include plural references unless the context clearly dictates otherwise. Thus, for example, reference to "a tool" is a reference to one or more tools and includes equivalents thereof known to those skilled in the art.

Unless defined otherwise, all technical and scientific terms used herein have the same meaning as commonly understood to one of ordinary skill in the art to which this invention belongs. Although any methods, devices, and materials similar or equivalent to those described herein can be used in the practice or testing of the invention, preferred methods, devices and materials are now described.

All publications, patent applications and patents mentioned herein are hereby incorporated herein by reference for the purpose of describing and disclosing, for example, the systems and methodologies that are described in the publications which might be used in connection with the present invention. Publications discussed throughout the text are provided solely for their disclosure prior to the filing date of the present application. Nothing herein is to be construed as an admission that the inventors are not entitled to antedate such disclosure by virtue of prior invention.

Reference will now be made in detail to implementations of the present invention as illustrated in the accompanying drawings. Wherever possible, the same reference numbers will be used throughout the drawings and the following description to refer to the same or like parts.

As used herein, the Internet refers at least to a collection of networks and gateways that use the transmission control protocol (TCP) or Internet protocol (IP) suite of protocols to communicate with one another. The World Wide Web (WWW) refers at least to a set of inter-linked hypertext documents residing on hypertext transport protocol (HTTP) servers. As used herein, WWW also refers at least to documents accessed on secure servers, such as HTTP servers (HTTPS), which provide for encryption and transmission through a secure port. WWW documents, which may be referred to herein as web pages can, for example, be written in hypertext markup language (HTML). As used herein, the term "web site" refers at least to one or more HTML documents and associated files, scripts, and databases that may be presented by an HTTP or HTTPS server on the WWW. The term "web browser" refers at least to software and hardware that lets a user view HTML documents and access files and software related to those documents.

Systems and methods in accordance with the invention can be implemented using any type of general purpose computer system, such as a personal computer (PC), laptop computer, server, workstation, personal digital assistant (PDA), mobile and/or wireless communications device, interconnected group of general purpose computers and the like, running any one of a variety of operating systems. An example of a general-purpose computer system usable with at least one embodiment of the present invention is illustrated in FIG. 1.

Referring briefly to FIG. 1, the general purpose computer system 10, on which the assessment system disclosed herein is run, includes a central processor 12, a main memory unit 14 for storing programs and/or data, an input/output controller 16, a network interface 18, a display device 20, one or more input devices 22, a fixed or hard disk drive unit 24, a removable media storage drive (i.e., floppy disk drive or compact disk (CD) drive) 26, a tape drive unit 28, and a data bus 30 which couples these components so as to allow communication there between as well as communication with other computer systems. Such communication occurs either via direct connection, via the world wide web, or via other means of communication such as cable, phone lines, microwave and wireless communication.

The central processor 12 used in the computer system 10 can be any type of microprocessor, such as a PENTIUM™ processor, made by Intel of Santa Clara, Calif. The display device 20 can be any type of display, such as a printer, or a liquid crystal display (LCD), cathode ray tube display (CRT), light emitting diode (LED), plasma gas (PG), and the like capable of displaying, in whole or in part, the outputs generated in accordance with the systems and methods of the invention. The input device 22 can be any type of device capable of providing the inputs described herein, such as keyboards, numeric keypads, touch screens, pointing devices, switches, styluses, and light pens. The network interface 18 can be any type of a device, card, adapter, or connector that provides the computer system 10 with network access to a computer or other device, such as a printer. In one embodiment of the present invention, the network interface 18 enables the computer system 10 to connect to a computer network such as the Internet and/or connect with another computer system upon which the systems and methods of the inventions disclosed herein can be practiced.

Those skilled in the art will appreciate that computer systems 10 embodying the present invention need not include every element shown in FIG. 1, and that equivalents to each of the elements are intended to be included within the spirit and scope of the invention. For example, the computer system 10 need not include the tape drive 28, and may include other types of drives, such as CD or Digital Video Disk (DVD) drives. CD drives can, for example, be written to and read from, thereby storing some or all of the data in the databases described herein.

In at least one embodiment of the present invention, one or more computer programs define the operational capabilities of the assessment system. These programs can be loaded into the computer system 10 in many ways, such as via the hard disk drive 24, the media storage drive 26, the tape drive 28, or the network interface 18. Alternatively, the programs can reside in a permanent memory portion (i.e., a read-only-memory (ROM) chip) of the main memory 14. In another embodiment, the computer system 10 can include specially designed, dedicated, hard-wired electronic circuits that perform all functions described herein without the need for instructions from computer programs.

In at least one embodiment of the present invention, the assessment system is part of a client-server system, in which a client sends requests to a server and a server responds to requests from a client. Of course, a "client" can be broadly construed to mean one who requests or gets the file, and "server" can be broadly construed to be the entity that downloads the file. Basically, the assessment system can be either a client system or a server system. In one embodiment, the invention is implemented at the server side and receives and responds to requests from a client, such as a reader application running on a user computer.

The client can be any entity, such as the computer system 10, or specific components thereof (e.g., terminal, personal computer, mainframe computer, workstation, a wireless hand-held device, electronic book, personal digital assistant, peripheral, etc.), or a software program running on a computer directly or indirectly connected or connectable in any known or later-developed manner to any type of computer network, such as the Internet. For example, a representative client is a personal computer that is x86-, PowerPC®, PENTIUM-based, or RISC-based, that includes an operating system such as IBM®, LINUX, OS/2®, or MICROSOFT WINDOWS (made by Microsoft Corporation of Redmond, Wash.) and that includes a Web browser, such as MICROSOFT INTERNET EXPLORER, NETSCAPE NAVIGATOR (made by Netscape Corporation, Mountain View, Calif.), having a Java Virtual Machine (JVM) and support for application plug-ins or helper applications. A client may also be a notebook computer, a handheld computing device (i.e., a PDA), an Internet appliance, a telephone, an electronic reader device, or any other such device connectable to the computer network.

The server can be any entity, such as computer system 10, a computer platform, an adjunct to a computer or platform, or any component thereof, such as a program that can respond to requests from a client. The server also may include a display supporting a graphical user interface (GUI) for management and administration, and an Application Programming Interface (API) that provides extensions to enable application developers to extend and/or customize the core functionality thereof through software programs including Common Gateway Interface (CGI) programs, plug-ins, servlets, active server pages (ASP), server side include (SSI) functions and the like.

Embodiments of the invention can be implemented using computer technologies such as software applications, computer-readable program media, data structures, carrier wave signals, user interfaces, and application program interfaces. For example, software embodying the present invention in one embodiment, resides in at least one application running on the computer system 10. In at least one embodiment, the present invention is embodied in a computer-readable program medium usable with the computer system 10. In at least one embodiment, the present invention is embodied in a data structure stored on a computer or a computer-readable program medium. In addition, in one embodiment, the present invention is embodied in a transmission medium, such as one or more carrier wave signals transmitted between the computer system 10 and another entity, such as another computer system, a server, a wireless network, etc. One embodiment of the present invention also can be embodied in an application programming interface (API) or a user interface. In addition, the present invention, in one embodiment, is embodied in a data structure.

In one embodiment, the present invention includes systems and methods that assess a user's level of compliance with certain standards and translate that assessment into a report detailing the user's specific level of compliance. The report is generated by the assessment system in response to the user answering certain questions which are focused on, for example, a regulatory requirement, or focused on a required level of security in a computer system. The report can also be generated by the assessment system after the results of a scan of the user's computer system are known. Or the assessment system could generate a report by incorporating both sets of results. The process may operate in three distinct steps: an initial input phase, a scan phase, and an output phase.

Figure 2:
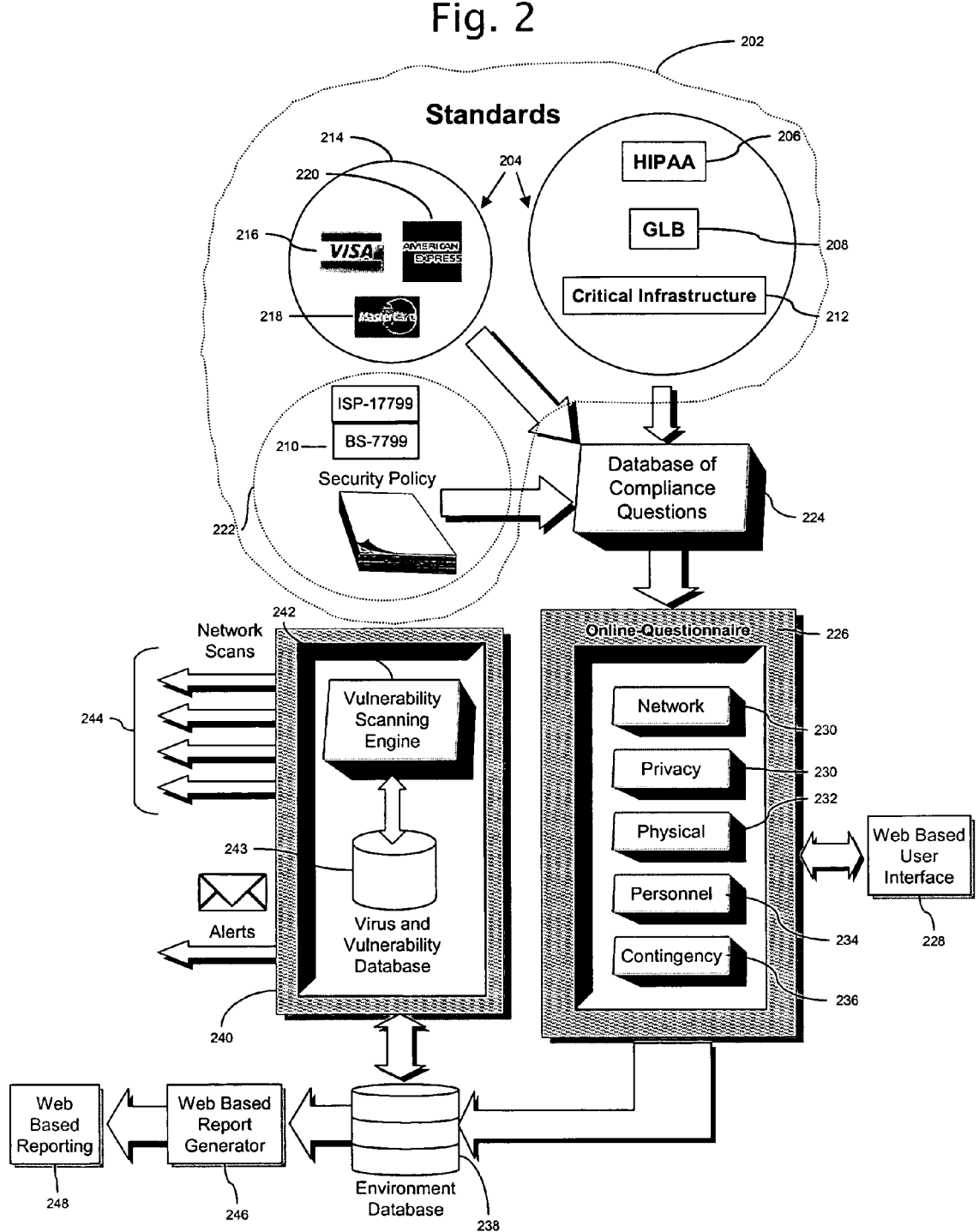
FIG. 2 illustrates a schematic diagram of a complete assessment according to one embodiment of the present invention.

In the initial input phase of an assessment determination, an operating framework is established. As illustrated in FIG. 2, the initial input phase of the compliance assessment system 200 can be characterized as selecting at least one compliance standard from within the operating framework 202 specific to the user being assessed. More particularly, the operating framework 202 selected determines the type of standard on which the compliance assessment system 200 will base its evaluation. For example, the operating framework 202 could be structured according to a certain type of regulatory standard 204. For example, HIPAA 206 is a specific type of regulatory standard that can be found at Title 45 of the Code of Federal Regulations, sections 160, 162, and 164 (45 CFR §160, 162, and 164). Similarly, how corporations handle a consumer's private information is also closely regulated by the strictures of the GLB Act 208 that can be found at Title 15 of the United States Code, Subchapter 1, Sections 6801-6809. Other types of regulatory standards may also include credit card associations such as VISA® Cardholder Information Security Program, etc. 209 Accordingly, substantially any type of critical infrastructure 212 having regulations associated with it can be quantitatively and qualitatively identified and implemented by the regulatory standards operating framework 204.

The operating framework 202 may alternatively be structured according to the security schemes 214 of any type of institution that conducts remote financial transactions. For example, an authorized bank (Issuing Bank) can issue VISA® or MasterCard® credit cards to its customers, and issues card swipe machines to the merchants that accept these cards. In order for a merchant to qualify with the Issuing Bank, the merchant must agree to abide by VISA® and MasterCard® security requirements prior to processing a customer's Internet-based credit card transaction, and properly safeguard financial information and card holder data of its customers, that merchant needs to comply with VISA's security scheme 216. As illustrated in FIG. 3, VISA's security scheme requires, among other things, that its merchants attest that they are practicing certain security best-practices by filling out a questionnaire that addresses these issues. Additionally, VISA® requires that its merchants that accept VISA® credit cards over the Internet comply with their security requirements. Similarly, MasterCard's security scheme 218, which, for example, may be found on the Internet currently at web address https://sdp.mastercardintl.com/bestpractices.pdf, requires among other things, administrative and policy surveys to be completed by its e-merchants, as well as external vulnerability scans, etc. Any other type of financial entity that processes financial transactions or allows its agents or subscriber merchants to process financial transactions will have similar security schemes 214. These include American Express® 220 (See web address http://home5.americanexpress.com/merchant/resources/fraudprevention/datasecurity_standards1.asp), entities that issue debit cards, entities that accept bank checks, and the like.

The operating framework 202 is also adaptable so that substantially any type of entity operating under a certain security policy 222 can implement the compliance assessment system 200. For example, before a software development corporation will allow its employees to remotely access their email from that corporation's servers, that software development corporation will typically have a security policy in place which details how such remote access will occur, and what safeguards are in place to prevent remote hacking, and the like. Similarly, this security policy can be implemented by that corporation in accordance with standards such as ISO-17799, which require that best practices are met which address remote access vulnerabilities. One example might be that the policy requires two-factor authentication (such as a personal password as well as a SecureID token password) before allowing a remote connection to the corporate network. A security policy can also be implemented in accordance with standards such as BS-7799 (the British Standard relating to information security best practices).

All of the various operating frameworks 202, which include but are not limited to regulatory standards 202, security schemes 214 security policies 222, and combinations thereof, are in essence items in a checklist that detail what must be contained in a user's computer operating environment in order to conduct business within a particular industry or company per a given operating framework. Each checklist item in a given operating framework 202 can be structured as a question, which is then presented to the user. Specifically, that question asks the user if that particular item is present on their computing environment.

As the checklist for each operating framework 202 is converted into a series of questions, those questions can be stored in a compliance question database 224. For example, the checklist associated with HIPAA regulatory standards 206, can be converted into a series of HIPAA compliance questions and stored in the compliance question database 224. Similarly, the checklist associated with VISA's security scheme 216 can be converted into a series of VISA compliance questions, which can also be stored in the compliance question database 224. Because each of the operating frameworks, such as the regulatory standards 204, the security schemes 214, and the security policies 222 have corresponding checklists, all those checklists can be stored in the compliance question database 224 in the form of questions. The existence of the compliance question database 224 allows the computer system to assess other user's compliance without needing to create a new set of questions.

Therefore, in one embodiment once the user begins the compliance assessment process, they will be presented with a list of options which best exemplify the user's operating framework 202. For example, if the user is a merchant department store that is planning to offer the ability to conduct credit card transactions using VISA® as the credit card, the user will select "VISA" as the type of operating framework 216. Alternatively, if the user is a hospital that stores patients' private medical records, the user would select the HIPAA operating framework 206. Once the type of operating framework 202 is selected, the compliance assessment system 200 retrieves the questions pertaining to that framework's requirements, in this case, either VISA® or HIPAA, respectively, from the compliance question database 224, and the questions are passed to the on-line questionnaire 226. The on-line questionnaire 226 is then presented to the user via the web-based user interface 228.

The compliance questions may alternatively be presented to the user orally, via written format, via a speech synthesizer, or by any other means for providing inquiries to a user, such as wireless transmission to a wireless device such as a PDA, cell phone or BlackBerry™ device. Similarly, input into the web-based user interface could alternatively be accomplished via an on-line portal, wireless device (PDA, pager, BlackBerry™, etc.), speech synthesizer, or other device which transmits the user's responses to the compliance system 200.

In a preferred embodiment, the user may be guided through a questionnaire that contains links to suggestions that help the user understand and respond to the compliance questions.

Figure 4:
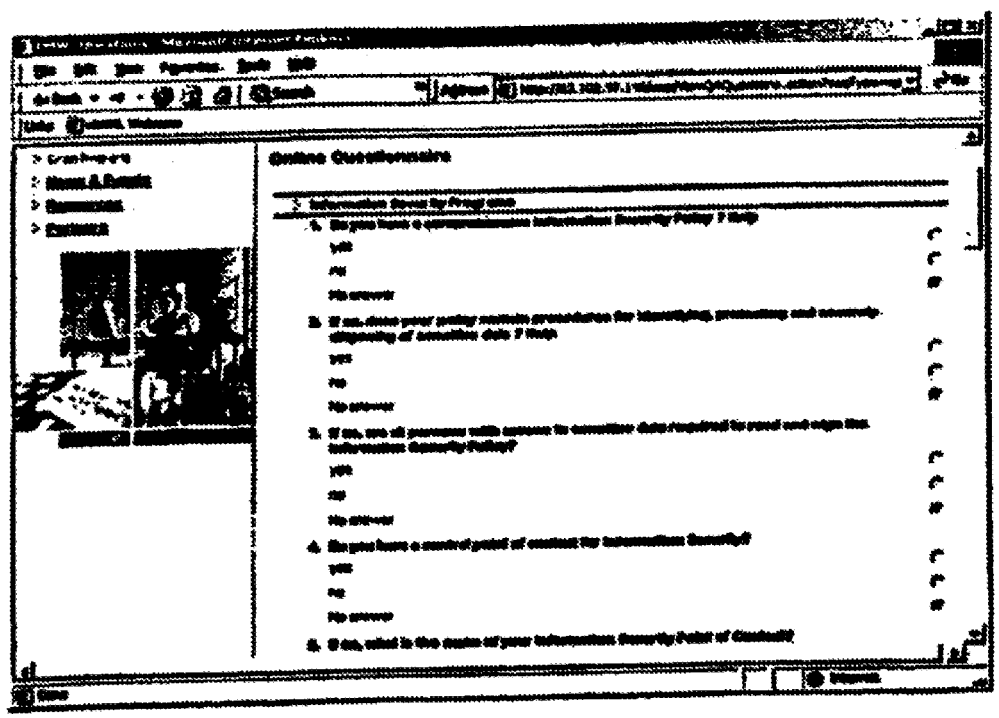
FIG. 4 illustrates a representation of a graphical user interface for an online questionnaire according to one embodiment of the present invention.

Via the web-based user interface 228, the on-line questionnaire 226 may prompt the user with questions about how an organization handles and protects information on their systems. Importantly, these questions may be tailored to take into account the user's specific operating framework 202, such as VISA's requirements about personal cardholder data. If the user had selected HIPAA regulations as its operating framework 202, the on-line questionnaire 226 prompts the user with questions that focus on concerns specific to HIPAA requirements. FIG. 4 illustrates what a user may view when prompted with the on-line questionnaire 226. FIG. 8 illustrates an exemplary questionnaire 226 within a HIPAA operating framework 206. It will be appreciated that one of ordinary skill in the art will readily understand how to similarly create questionnaires 226 based on other of the aforementioned operating frameworks 202. As can be seen in FIG. 8, each possible response to a question may generate a recommendation to help the user ensure that compliance is either maintained or attained if not in compliance.

Other questions in a compliance question database 226 may include corporate guidelines, security policies, or other regulations that require certain levels of compliance. When presented to the user, the questions in the on-line questionnaire 226 are mapped or grouped by specific policy areas. For example, as shown in FIG. 2, the questions may be grouped into the following policy areas: network security concerns 228, related to whether an organization has a properly configured firewall; privacy concerns 230, addressing how an organization protects personal information; physical concerns 232 regarding the user's hardware, which address issues such as locking doors and limiting access to critical system rooms; personnel concerns 234, such as whether background checks are performed on employees; and contingency concerns 236, such as plans to continue operations after a power outage. Other policy areas or subsets of existing policy areas may, for example, include: off-line data security, on-line data security, server security, authentication and validation, human resources, and disaster recovery. More generally, the questions presented to the user via the on-line questionnaire 226 may include, but are not limited to, questions related to firewalls, security patches, encryption of stored data, encryption of data sent over open networks, use of anti-virus programs, data access restrictions, and the assignment of unique user identifiers or other equivalent or related questions.

As the user answers each question in the on-line questionnaire 226, responses are weighted according to their importance. For example, an affirmative response in one scenario might be deemed more valuable and assigned a higher weight than a negative response. The converse is also possible. Once the responses are weighted according to their value, they are stored in the environment database 238. The weighted responses can be utilized alone or in conjunction with other data generated by the scan discussed herein, to present the user with a compliance assessment of their computer system.

According to principles of the present invention, the weighing of answers to the questionnaire 226 may be performed using a scoring algorithm. The scoring algorithm may assign, or rank, a risk "weight" or "cost" for each answer to a question in the questionnaire. For example, answers to questions related to "high risk" vulnerabilities (i.e., vulnerabilities that could result in immediate compromising of information and/or systems, etc.) may be weighted, or have a risk cost "worth", for example, 10 points; answers to questions related to "medium risk" vulnerabilities (i.e., vulnerabilities that could potentially result in information or system being compromised, etc.) may be weighted, or have a risk cost "worth", for example, 2 points; and answers to questions related to "low risk" vulnerabilities (i.e., vulnerabilities such as configurations that might reveal interesting reconnaissance information, represent a departure from good practices, etc.) be weighted, or have a risk cost "worth", for example, 1 point.

It will be appreciated, however, that the respective weights of answers to questions related to high, medium, and low-risk vulnerabilities may be adjusted depending on the requirements of the operating framework, information on the user's computer network, etc. Additionally, it will be appreciated that what constitutes a "high", "medium", or "low" risk may be subject to change depending on the requirements of the operating framework, information on the user's computer network, etc. Additionally, it will be appreciated that additional or different categories other than "high," "medium," and "low" could be used in such a scoring system.

As mentioned above, the weighted responses to the questionnaire 226 can be utilized alone or in conjunction with other data generated by the scan discussed herein, to present the user with a compliance assessment of their computer system. In one aspect of the present invention, the user's computer system may be determined not to be in compliance with the selected operating framework 202 based on an excessive number of predetermined types of vulnerabilities, wherein predetermined vulnerabilities have different risk costs associated with them. Accordingly, points associated with various answers that indicate the existence of vulnerabilities may be added together and measured against a threshold point value for an unacceptable amount of risk. For example, the threshold point value may be 10. Accordingly, if, for example, the answers of the questionnaire indicated the existence of a vulnerability to only one question directed to a "high risk" vulnerability, the scoring algorithm determines that the computer system is not in compliance with the selected operating framework 202. If, for example, answers of the questionnaire indicated the existence of vulnerabilities to five questions directed to "medium risk" vulnerabilities, the scoring algorithm determines that the computer system is not in compliance with the selected operating framework 202. If, for example, answers of the questionnaire indicated the existence of vulnerabilities to ten questions directed to "low risk" vulnerabilities, the scoring algorithm determines that the computer system is not in compliance with the selected operating framework 202.

FIG. 5 illustrates an exemplary questionnaire 226 in accordance with the principles of the present invention showing individual risk costs for questions that are prompted to a user wishing to perform a security assessment of their computer network. Referring to FIG. 5, fields designated by reference numeral 62 may comprise specific questions related to the user's computer system; fields designated by reference numeral 64 may indicate the severity of the risk (e.g., high, medium, low) related to a particular question; and fields designated by reference numeral 66 may indicate the risk "weight" or "cost" associated with the particular risk level of severity. In one aspect of the present invention, questions presented in fields designated by reference numeral 62 may, for example, provide substantially complete coverage of all the requirements of credit card associations. Accordingly, the questionnaire 226 illustrated in FIG. 5 may help provide a compliance assessment for substantially an entire industry. In one aspect of the present invention, the questionnaire illustrated in FIG. 5 may include questions directed to substantially all issues raised by the aforementioned VISA® and MasterCard® security schemes. In another aspect of the present invention, and as shown in FIG. 5, at least one level of risk (e.g., high, medium, or low) may be assigned to any particular question within the questionnaire 226, wherein a risk cost may selectively correspond to one of the assigned risk levels based on requirements of the operating framework, information on the user's computer network, etc.

In one aspect of the present invention, the vulnerability scanner 240 described herein may correspond substantially to the network parameter input module 220 and first scanning module 230 illustrated in FIG. 2, the assessment module 305 illustrated in FIG. 3, and/or the scanning apparatus 400 illustrated in FIG. 4 substantially as disclosed in the aforementioned co-pending application. Accordingly, the vulnerability scanning engine 242 may perform a vulnerability scanning operation using data from the virus and vulnerability database 243. During a second phase of the compliance assessment (i.e., the aforementioned scan phase), the user's network may be scanned using a mechanism capable of providing real-time verification of certain data input by the user through the questionnaire in order to make the overall compliance and/or vulnerability determination of the user.

Each scan of the user's network conducted by the vulnerability scanner 242 results in the generation of environment data, as described in the co-pending application. This environment data is stored in environment database 238, as is also described in the co-pending application. In one aspect of the present invention, the environment database 238 may be the same database in which the results of the user query and/or on-line questionnaire 226 are stored. Alternatively, the environment data and the results of the user query and/or on-line questionnaire 226 can be stored in separate databases.

As is described in greater detail in the co-pending application, which is hereby incorporated by reference, the scan of the user's network may be based off of scan parameters generated, at least in part, by the responses to the on-line questionnaire 226. In one aspect of the present invention, the scan parameters may be generated by automating logical decision tree steps wherein the decision tree may, for example, comprise an XML document describe the logical flow of activities performed during a particular scan as well as the use of particular tools during the scan. In one aspect of the present invention, the decision tree may describe the flow of scanning activities based both on user-provided parameters as well as results from the tools as they are returned. In another aspect of the present invention, the decision tree may be indexed by the selected operating framework 202.

In another aspect of the present invention, the scan of the user's network may be performed using at least one scan tool capable of generating data results (e.g., domain name resolvers, port scanners, nslookup, dig, whois, ping, traceroute, rpcinfo, nbstat, net use, smbclient, nmblookup, nmap, nessus, whisker, nikto, onesixtyone, Pptp_robe, Gbg, Wget, Lantern, QTIP, dorian, etc.), wherein the data results may wrapped into a common language and be used to create further inquiries on the on-line questionnaire 226. In one aspect of the present invention, individual tasks within a scan may be separately managed and/or scheduled. In another aspect of the present invention, languages defining the tasks may be wrapped into a language corresponding to the tool performing the task. In one aspect of the present invention, the scanning may be carried out using, for example, a task handler, a schedule master, and the like.

Once the vulnerability scanning engine completes all of its scans, thereby generating all the applicable environment data, the third phase of the compliance assessment system in the present invention, the output phase, can proceed. The output phase generates an analysis of the user's scanned network as it relates to the operational framework employed by the user, as well as how it relates to the user's network's vulnerability posture. Alternatively, the third phase may be initiated before all of the scans are complete, or before all of the environment data has been generated, or even before the user has completed the on-line questionnaire. For example, the third phase may be initiated whenever applicable environment data is generated. Accordingly, as the scan progresses and applicable environment data is generated, the output phase may be initiated.

The output phase relies on the data in the environment database 238 to generate the system assessment or evaluation. For example, once all the results of the on-line questionnaire 226 have been weighted and stored in the environment database 238, and once the scan of a given system is complete and the task results 436 stored in the environment database 238, the environment database 238 contains all the weighted answers as well as all the environment data. The database tables holding the weighted results of the on-line questionnaire 226 and hold the task results 436 are represented in FIG. 6.

Figure 6:
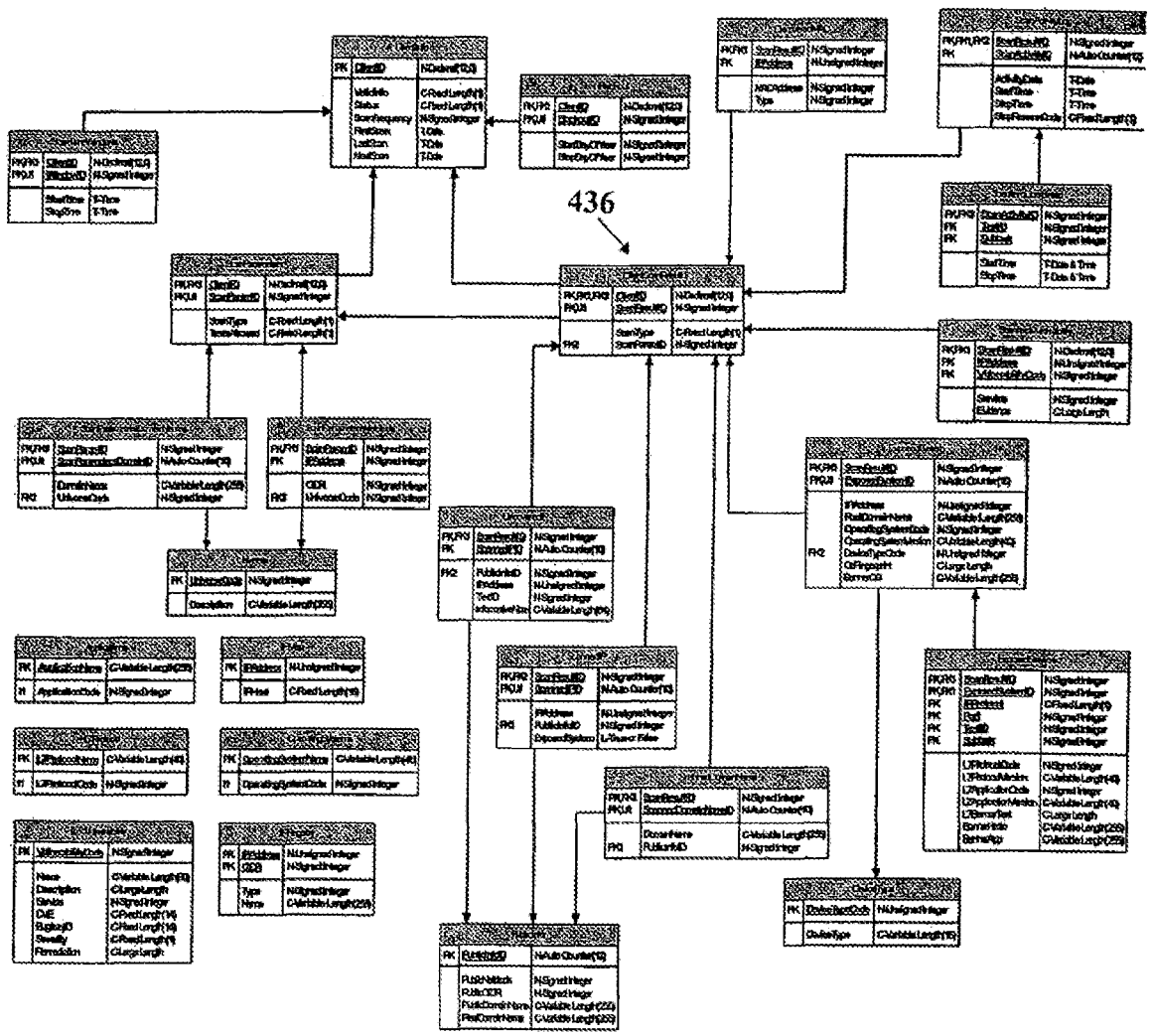
FIG. 6 illustrates the types of tables in the system's database.

Referring to FIG. 6, in one embodiment of the present invention the environment database 238 of FIG. 2, which can also be referred to as a client environment database (CED), can be written in any database management software known in the art, including SQL. In one embodiment of the present invention, the CED may contain multiple distinct sections which, as described in the co-pending application, aid in generating scans for the vulnerability scanning engine 242. However, the database tables in either the environment database 238 of FIG. 2 or the CED of FIG. 6 are also used to hold the environment data as well as the responses to the on-line questionnaire 226.

In one aspect of the present invention, the environment database may contain information related at least one of scan parameter, scan frequency, scan time period, scan result, scan start time, scan stop time, next scan date, status of network, discovered MAC addresses, scan activity log, exposed systems, exposed services, scanned domain names, scanned IP, discovered IP, applications used in scanning, and the like.

Once the environment database 238 of FIG. 2, or the CED of FIG. 6, are populated with all the applicable weighted results and environment data, the vulnerability report generator 246 compares those results with the operating framework 202 initially selected by the user in phase one of the compliance assessment to provide an indication of whether the scanned system complies with the particular requirements of that operating framework 202, such as the HIPAA regulatory standard 204 or the VISA® security scheme 216. In this third phase, the vulnerability report generator 246 may indicate which aspects of the user's network are vulnerable to security breaches and how such breaches might occur. By providing specific details regarding such vulnerability, the vulnerability assessment system 200 enables the user being scanned to develop adequate security protection to eliminate that vulnerability.

Figure 7:
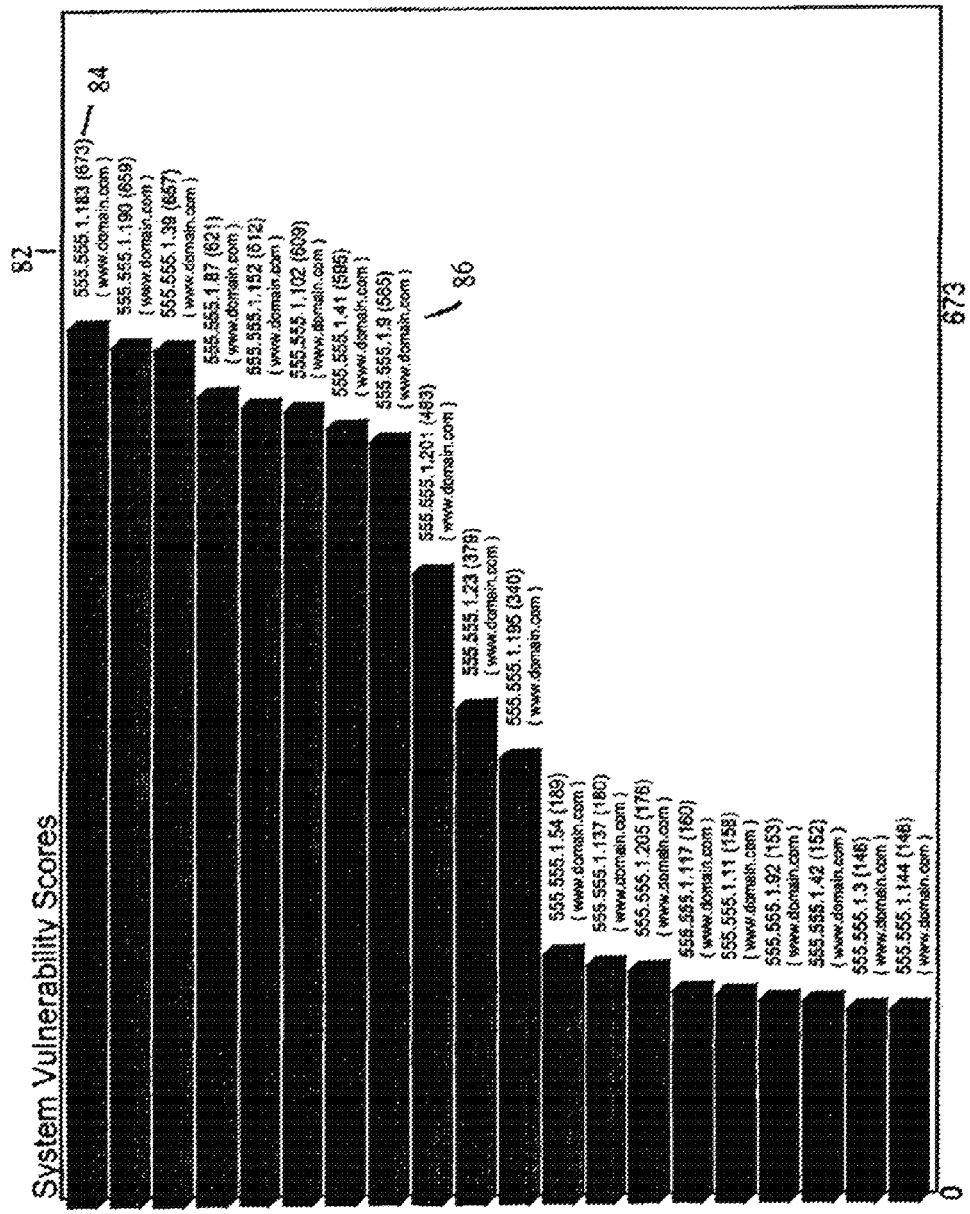
FIG. 7 illustrates a representation of a graphical analysis generated by a scan.

For example, the program may classify and briefly list each of the potential vulnerabilities identified, and may associate an intuitive descriptor such as "low risk," "medium risk," "high risk," "informational risk," or "administrative risk" to each potential vulnerability. These results may indicate a "pass" or "fail" grade, or may be in tabular form. FIG. 7 can also depict the results of a vulnerability scan in a graphical format. As shown in FIG. 7, the graphically depicted results rank the twenty most vulnerable systems on the user network, from most vulnerable to least vulnerable. Within the graphical depiction of FIG. 7 the field designated by reference numeral 82 includes the IP address of the system, the field designated by reference numeral 84 includes the total number of vulnerabilities within the system, and the field designated by reference numeral 86 includes the domain of the system. The vulnerability scan may reveal the level of vulnerability for all accessible hosts and network services available on a network, or it can scan just the selected hosts and network services. In the preferred embodiment, the results generated by the vulnerability report generator 246 can be provided to the user over the Internet 248. However, those same results can be provided by other means described herein, including in written form, orally, via speech synthesizer and wirelessly.

Similarly, the vulnerability report generator 246 can include suggestions or recommendations on how to solve the identified vulnerabilities such as those illustrated in FIG. 8. If the report is provided as an HTML page, that HTML page can contain links 808 to security patches which are specific for the operating systems and/or other software of the user's system and identified vulnerability. In addition, the results of the vulnerability scan may be provided as an e-mail alert 250 to the user, particularly if the user has selected a periodic assessment of their network's security or ongoing compliance. In another aspect of the present invention, the vulnerability report generator 246 may generate a report including how well the user's computer network complies with the selected operating framework compared to an industry average or other selected computer networks.

The assessment system 200 is preferably scalable to different networks and operating platforms as well as is scalable to different ranges of security. The scalability of the questionnaire relates to its database schema and architecture which allows for an unlimited number of questions to be added to the database in order to address evolving standards or requirements. The reporting module is similarly scalable in its capability to extract pertinent information from the various database components of the tool and incorporate them into a final report.

The assessment system 200 may also have a security device capable of preventing confidential information from being scanned. In one embodiment, the on-line questionnaire prompts the user to detail any and all sites, etc., that should not be scanned. For instance, if a particular user has a stand-alone server that is not part of any transactional elements within that environment, its IP address may be called out and excluded from the network scan.

The invention has been described in detail with particular reference to a preferred embodiment thereof. However, it will be appreciated that those skilled in the art, upon consideration of this disclosure may make variations and modifications within the spirit and scope of the invention. It is intended that the specification and examples be considered as exemplary only, with a true scope and spirit of the invention being indicated by the following claims.

What is claimed is:

1. A computer system for determining compliance of a computer network, comprising:
    a memory storing an operating framework of various predetermined compliance standards with which to measure against the computer network,
    the various predetermined compliance standards comprising at least a governmental regulatory standard having requirements for protecting confidentiality of health-related information and a payment card information security program having requirements for destruction of data stored on electronic media beyond reconstruction or prevention of data being stored on electronic media;
    a compliance question database, comprising questions relating to whether the computer network complies with requirements of the various predetermined compliance standards answerable by a user to verify compliance with the various predetermined compliance standards, for selecting the governmental regulatory standard of the various predetermined compliance standards specific to the user; and
    a processor configured to provide predetermined compliance questions to the user based on the selected governmental regulatory standard of the various predetermined compliance standards, receive the user's answer to the predetermined compliance questions, and store the user's answer to the predetermined compliance questions in a compliance answer database;
    wherein the processor is further configured to scan the computer network, generate a score indicating the degree to which the computer network complies with the selected governmental regulatory standard of the various predetermined compliance standard based on the scan of the computer network and the user's answer in the compliance answer database, and generate a report including a result as to whether the computer network complies with the requirements of the selected predetermined compliance standard based on the score, and when the generated score identifies non-compliance of the computer network, including information how to solve the non-compliance with the report.

2. The system of claim 1, wherein the processor provides the predetermined compliance questions in an on-line questionnaire presentable to the user via a web-based interface.

3. The system of claim 2, wherein the on-line questionnaire further comprises links to suggestions on how to understand and respond to the questions.

4. The system of claim 1, wherein the processor is further configured to send a wireless electronic transmission to a mobile device as part of the scan of the computer network.

5. The system of claim 1, wherein the predetermined compliance questions in similar policy areas are grouped together by the processor prior to being provided to the user.

6. The system of claim 5, wherein the policy areas comprise at least one selected from the group consisting of:
    network security concerns related to whether an organization has a properly configured firewall,
    privacy concerns addressing how an organization protects personal information,
    physical concerns regarding the user's hardware, and
    contingency concerns regarding plans to continue computer network operations after a power outage, off-line data security, on-line data security, server security, authentication and validation, human resources, and disaster recovery.

7. The system of claim 1, wherein the compliance question database comprises questions related to at least one selected from the group consisting of corporate guidelines, security policies, and regulations requiring predetermined levels of compliance.

8. The system of claim 1, wherein the compliance question database comprises questions related to at least one selected from the group consisting of firewalls, security patches, encryption of stored data, encryption of data sent over open networks, use of anti-virus programs, data access restrictions, and the assignment of user identifiers.

9. The system of claim 1, further comprising:
    generating the score based on weighting means for selectively assigning varying levels of importance to answers to the predetermined compliance questions.

10. The system of claim 1, wherein the processor is further configured to store the score in the compliance answer database.

11. The system of claim 1, wherein the requirements of the at least one compliance standard further comprises retaining documentation for 6 years from creation of the documentation.

12. The system of claim 1, wherein the requirements of the at least one compliance standard further comprises identification of a security official.

13. A method for determining compliance of a computer network, wherein all steps are performed by a computer, the method comprising:
    storing in a memory on a computer system an operating framework of various predetermined compliance standards with which to measure against the computer network,
    the various predetermined compliance standards comprising at least a governmental regulatory standard having requirements for protecting confidentiality of health-related information and a payment card information security program having requirements for destruction of data stored on electronic media beyond reconstruction or prevention of data being stored on electronic media;
    selecting the a payment card information security program having requirements for destruction of data stored on electronic media beyond reconstruction of the various predetermined compliance standards specific to the user;
    storing in a compliance question database on a computer system, questions relating to whether the computer network complies with requirements of the various predetermined compliance standard answerable by a user to verify compliance with the selected payment card information security program of the predetermined compliance standards;

providing predetermined compliance questions to the user based on the selected payment card information security program of the predetermined compliance standards;

receiving the user's answer to the predetermined compliance questions;

storing the user's answer to the predetermined compliance questions in a compliance answer database;

scanning the computer network;

generating a score indicating the degree to which the computer network complies with the selected payment card information security program of the predetermined compliance standards based on the scan of the computer network and the user's answer in the compliance answer database;

generating a report including a result as to whether the computer network complies with the requirements of the selected payment card information security program of the predetermined compliance standards based on the score; and including information how to solve non-compliance with the report when the generated score identifies non-compliance of the computer network.

14. The method of claim 13, wherein the step of providing the predetermined compliance questions includes presenting an on-line questionnaire to the user via a web-based interface.

15. The method of claim 14, wherein the on-line questionnaire further comprises links to suggestions on how to understand and respond to the questions.

16. The method of claim 13, further comprising:
transmitting a wireless electronic signal to a mobile device as part of the step of scanning the computer network.

17. The method of claim 13, further comprising:
grouping the predetermined compliance questions in similar policy areas together prior to the step of providing the predetermined compliance questions to the user.

18. The method of claim 17, wherein the policy areas comprise at least one selected from the group consisting of:
network security concerns related to whether an organization has a properly configured firewall,
privacy concerns addressing how an organization protects personal information,
physical concerns regarding the user's hardware, and
contingency concerns regarding plans to continue computer network operations after a power outage, off-line data security, on-line data security, server security, authentication and validation, human resources, and disaster recovery.

19. The method of claim 13, further comprising:
selecting questions from the compliance question database relating to at least one selected from the group consisting of corporate guidelines, security policies, and regulations requiring predetermined levels of compliance.

20. The method of claim 13, further comprising:
presenting questions from the compliance question database related to at least one selected from the group consisting of firewalls, security patches, encryption of stored data, encryption of data sent over open networks, use of anti-virus programs, data access restrictions, and the assignment of user identifiers.

21. The method of claim 13, further comprising:
generating the score based on weighting means for selectively assigning varying levels of importance to answers to the predetermined compliance questions.

22. The method of claim 13, further comprising:
storing the score in the compliance answer database.

23. The method of claim 13, wherein the requirements of the at least one compliance standard further comprises a prohibition against connections between publicly accessible servers and any component of the computer network that stores cardholder data.

24. The method of claim 13, wherein the requirements of the at least one compliance standard further comprises documentation of all connections to databases that store cardholder data.

25. A computer system for determining compliance of a computer network, comprising:
a memory storing an operating framework of various predetermined compliance standards with which to measure against the computer network;
the various predetermined compliance standards comprising at least a governmental regulatory standard having requirements for protecting confidentiality of health-related information and a payment card information security program having requirements for destruction of data stored on electronic media beyond reconstruction;
a compliance question database, comprising questions relating to whether the computer network complies with requirements of the various predetermined compliance standards answerable by a user to verify compliance with the various predetermined compliance standards, for selecting the payment card information security program having requirements for destruction of data stored on electronic media beyond reconstruction of the various predetermined compliance standards specific to the user;
a processor configured to provide predetermined compliance questions to the user based on the selected payment card information security program of the predetermined compliance standard standards, receive the user's answer to the predetermined compliance questions, and store the user's answer to the predetermined compliance questions in a compliance answer database;
wherein the processor is further configured to scan the computer network, generate a score indicating the degree to which the computer network complies with the selected payment card information security program of the predetermined compliance standards based on the scan of the computer network and the user's answer in the compliance answer database, and generate a report including a result as to whether the computer network complies with the requirements of the selected payment card information security program of the predetermined compliance standards based on the score, and including information how to solve non-compliance with the report when the generated score identifies non-compliance of the computer network.

26. The system of claim 25, wherein the processor provides the predetermined compliance questions in an on-line questionnaire presentable to the user via a web-based interface.

27. The system of claim 26, wherein the on-line questionnaire further comprises links to suggestions on how to understand and respond to the questions.

28. The system of claim 25, wherein the processor is further configured to send a wireless electronic transmission to a mobile device as part of the scan of the computer network.

29. The system of claim 25, wherein the predetermined compliance questions in similar policy areas are grouped together by the processor prior to being provided to the user.

30. The system of claim 29, wherein the policy areas comprise at least one selected from the group consisting of:
- network security concerns related to whether an organization has a properly configured firewall,
- privacy concerns addressing how an organization protects personal information,
- physical concerns regarding the user's hardware, and
- contingency concerns regarding plans to continue computer network operations after a power outage, off-line data security, on-line data security, server security, authentication and validation, human resources, and disaster recovery.

31. The system of claim 25, wherein the compliance question database comprises questions related to at least one selected from the group consisting of corporate guidelines, security policies, and regulations requiring predetermined levels of compliance.

32. The system of claim 25, wherein the compliance question database comprises questions related to at least one selected from the group consisting of firewalls, security patches, encryption of stored data, encryption of data sent over open networks, use of anti-virus programs, data access restrictions, and the assignment of user identifiers.

33. The system of claim 25, further comprising:
- generating the score based on weighting means for selectively assigning varying levels of importance to answers to the predetermined compliance questions.

34. The system of claim 33, wherein the processor is further configured to store the score in the compliance answer database.

35. The system of claim 25, wherein the requirements of the at least one compliance standard further comprises retaining documentation for 6 years from creation of the documentation.

* * * * *